United States Patent [19]
Wakabayashi et al.

[11] Patent Number: 5,592,595
[45] Date of Patent: Jan. 7, 1997

[54] INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING

[75] Inventors: Kenichi Wakabayashi; Kaoru Hatakoshi; Kiyotaka Nishimura; Tsuyoshi Morikawa; Tadashi Shiozaki; Akira Nakajima; Hajime Nishizawa; Chitoshi Takayama, all of Suwa, Japan

[73] Assignee: Seiko Epson Corporation, Japan

[21] Appl. No.: 372,488

[22] Filed: Jan. 12, 1995

Related U.S. Application Data

[62] Division of Ser. No. 816,455, Dec. 30, 1991.

[51] Int. Cl.$^6$ ................................................ G06K 15/00
[52] U.S. Cl. ........................................... 395/115; 395/502
[58] Field of Search ..................................... 395/115, 116, 395/113, 112, 162, 166, 164, 165, 163; 371/24, 25.1, 47.1, 21.1

[56] References Cited

U.S. PATENT DOCUMENTS

| | | |
|---|---|---|
| 4,441,164 | 4/1984 | Paval et al. . |
| 4,691,317 | 9/1987 | Miazga et al. ............... 371/29.1 |
| 4,730,947 | 3/1988 | Ikeda et al. . |
| 4,872,091 | 10/1989 | Maniwa et al. . |
| 4,908,637 | 3/1990 | Chung et al. . |
| 4,949,188 | 8/1990 | Sato . |
| 5,041,918 | 8/1991 | Ishida et al. . |
| 5,075,874 | 12/1991 | Steeves et al. . |
| 5,109,490 | 4/1992 | Arimilli et al. . |
| 5,137,379 | 8/1992 | Ukai et al. . |
| 5,200,958 | 4/1993 | Hamilton et al. ............... 371/29.1 |

FOREIGN PATENT DOCUMENTS

| | | |
|---|---|---|
| 58-211285 | 12/1983 | Japan . |
| 60-52885 | 4/1985 | Japan . |
| 60-52884 | 4/1985 | Japan . |
| 60-142730 | 7/1985 | Japan . |
| 60-218939 | 11/1985 | Japan . |
| 61-196495 | 8/1986 | Japan . |
| 62-1181 | 1/1987 | Japan . |

(List continued on next page.)

*Primary Examiner*—Arthur G. Evans
*Attorney, Agent, or Firm*—W. Glen Johnson

[57] ABSTRACT

The image processing performance of a present day or existing page printer, e.g., electrophotographic printer, is improved and accelerated with the use of a detachable intelligent cartridge which contains a CPU and necessary memory to process print data into image dated for the electronic control unit of the printer to which the cartridge is attached. Depending, upon the page description language (PDL) to be employed, a cartridge can be selected for use with the printer and accelerate its PDL conversion and printing output. The intelligent cartridge CPU, which is different from the printer CPU, receives print data are from the printer and, since the data bus connecting the intelligent cartridge and the electronic control unit of the printer has only a read only capability from the electronic control unit, data transfer to the cartridge is made possible by utilizing the print data as an index for the read address accomplished by the printer CPU. The bit image data is accomplished by the cartridge CPU from print data received via the printer CPU and after data development, the bit image data is transferred to the printer for hardcopy printout.

8 Claims, 13 Drawing Sheets

FOREIGN PATENT DOCUMENTS

| | | |
|---|---|---|
| 62-5875 | 1/1987 | Japan . |
| 62-14689 | 1/1987 | Japan . |
| 62-75991 | 4/1987 | Japan . |
| 62-111776 | 5/1987 | Japan . |
| 62-299892 | 12/1987 | Japan . |
| 63-41163 | 2/1988 | Japan . |
| 63-250788 | 10/1988 | Japan . |
| 63-255750 | 10/1988 | Japan . |
| 64-7281 | 1/1989 | Japan . |
| 1-159274 | 6/1989 | Japan . |
| 2-58789 | 2/1990 | Japan . |
| 2-37590 | 2/1990 | Japan . |
| 2-64728 | 3/1990 | Japan . |
| 2-121023 | 5/1990 | Japan . |
| 2-122343 | 5/1990 | Japan . |
| 2-155675 | 6/1990 | Japan . |
| 2-159615 | 6/1990 | Japan . |
| 2-244851 | 9/1990 | Japan . |
| 2-249022 | 10/1990 | Japan . |
| 2-253289 | 10/1990 | Japan . |
| 2-288985 | 11/1990 | Japan . |
| 2-301463 | 12/1990 | Japan . |
| 2-301890 | 12/1990 | Japan . |
| 3-22160 | 1/1991 | Japan . |
| 3-45365 | 2/1991 | Japan . |
| 3-53635 | 3/1991 | Japan . |
| 3-51938 | 3/1991 | Japan . |

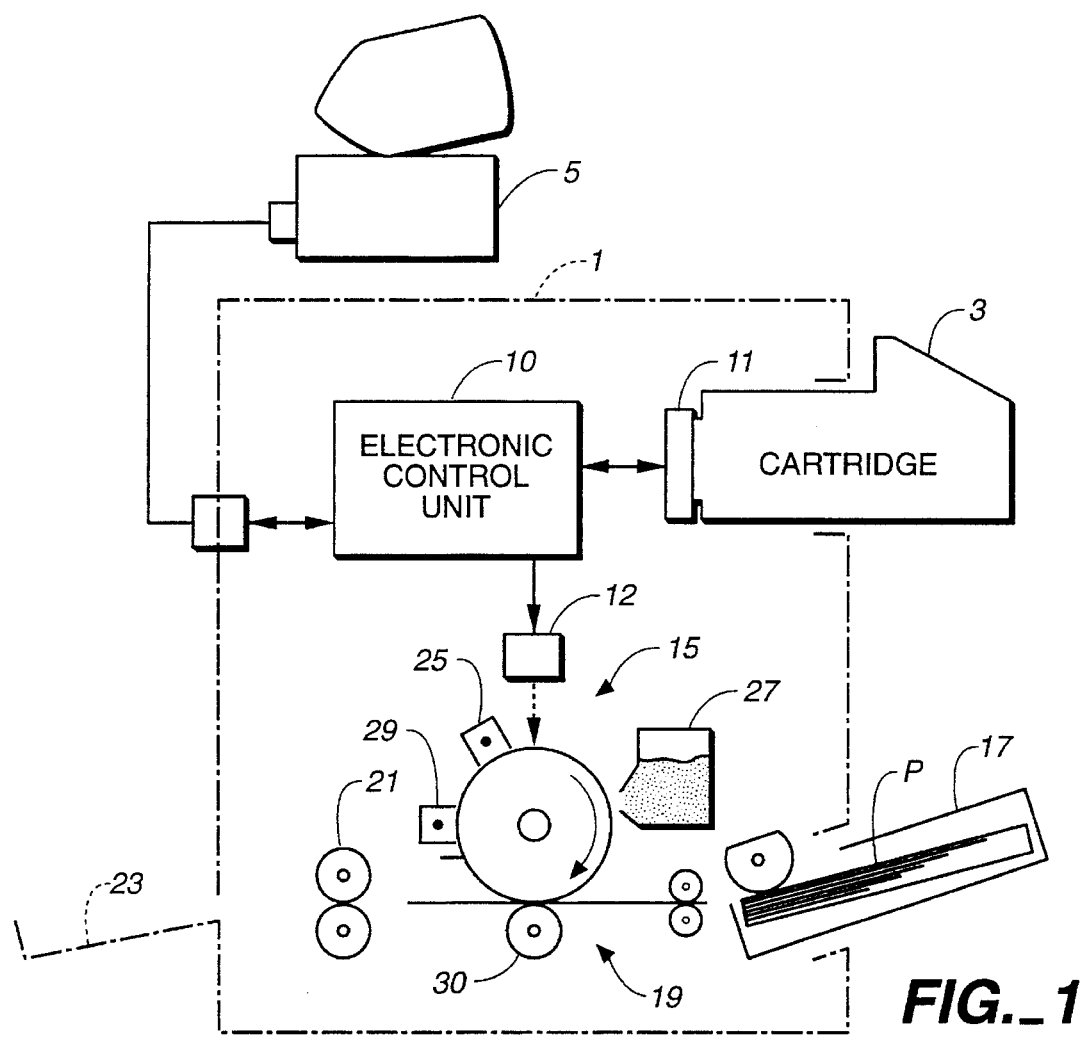
FIG._1
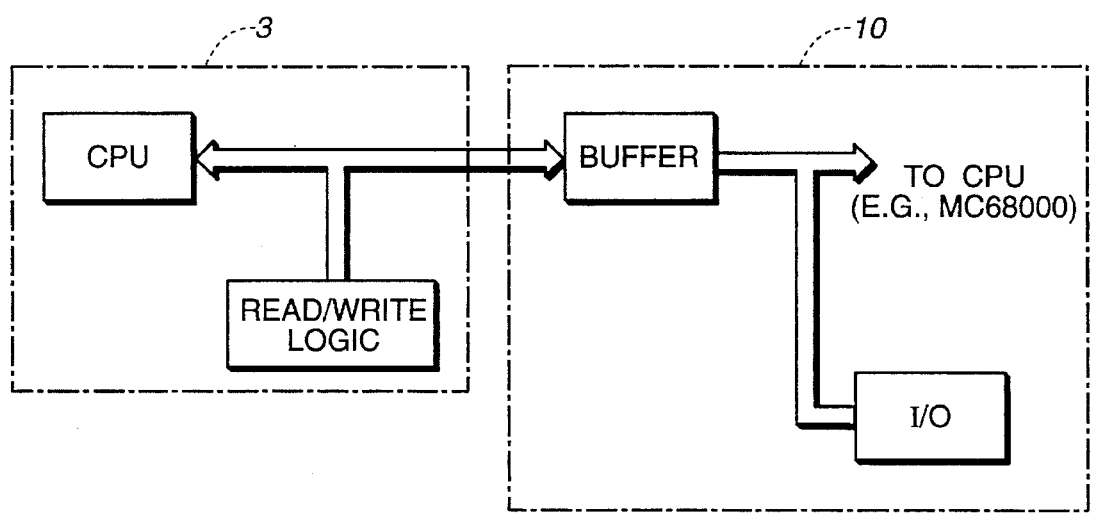
FIG._1A

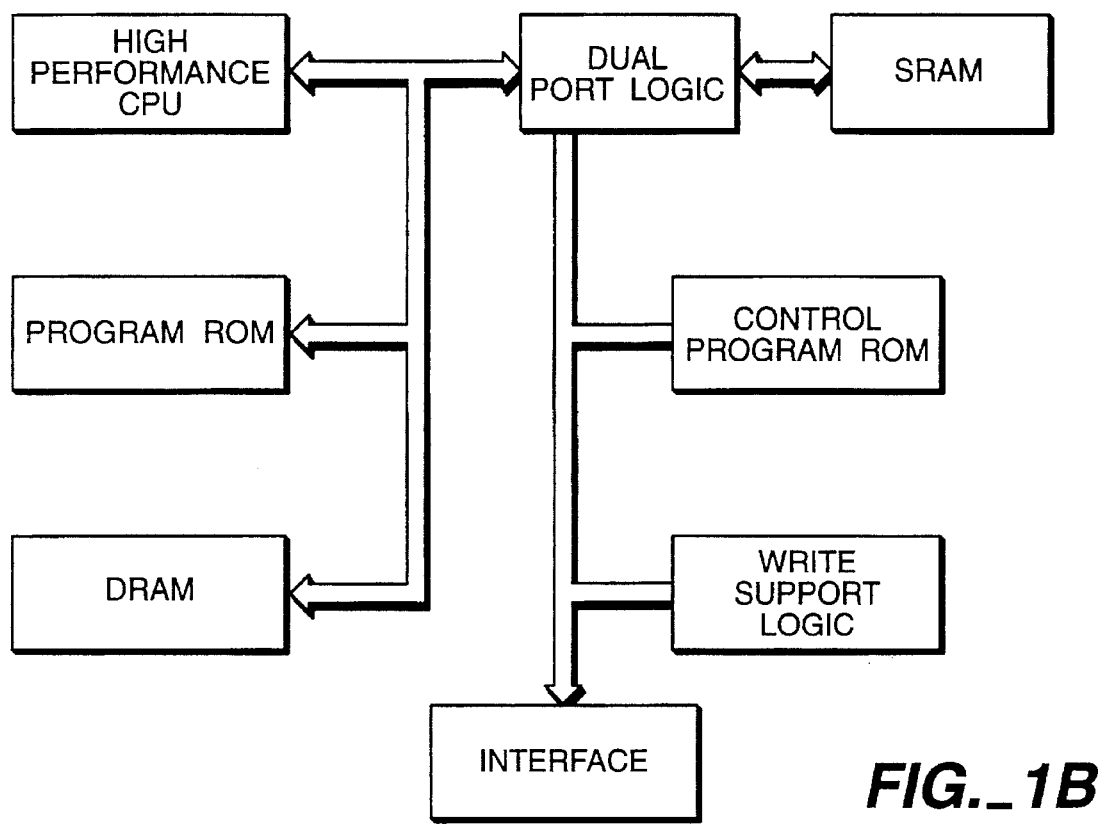
FIG._1B
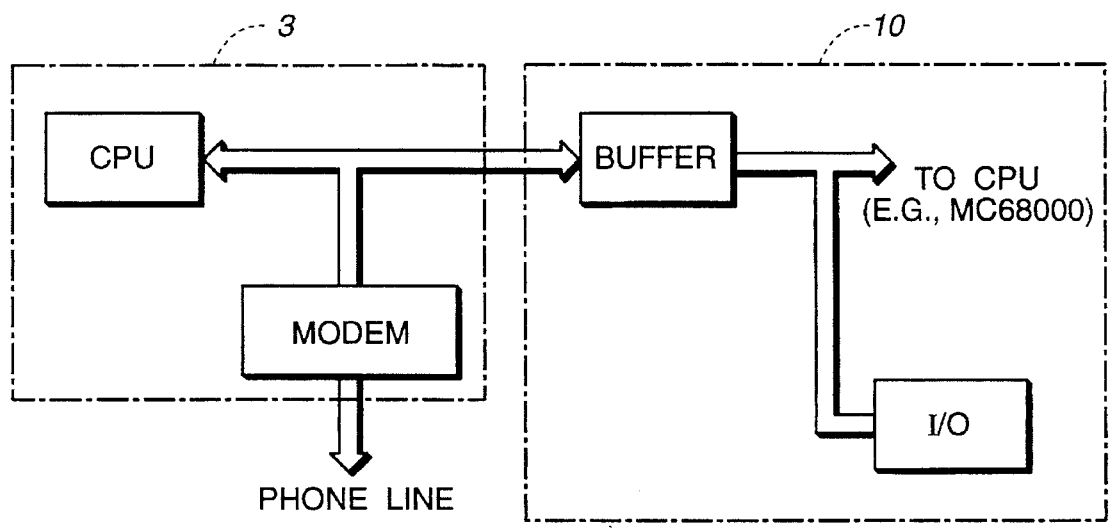
FIG._1C

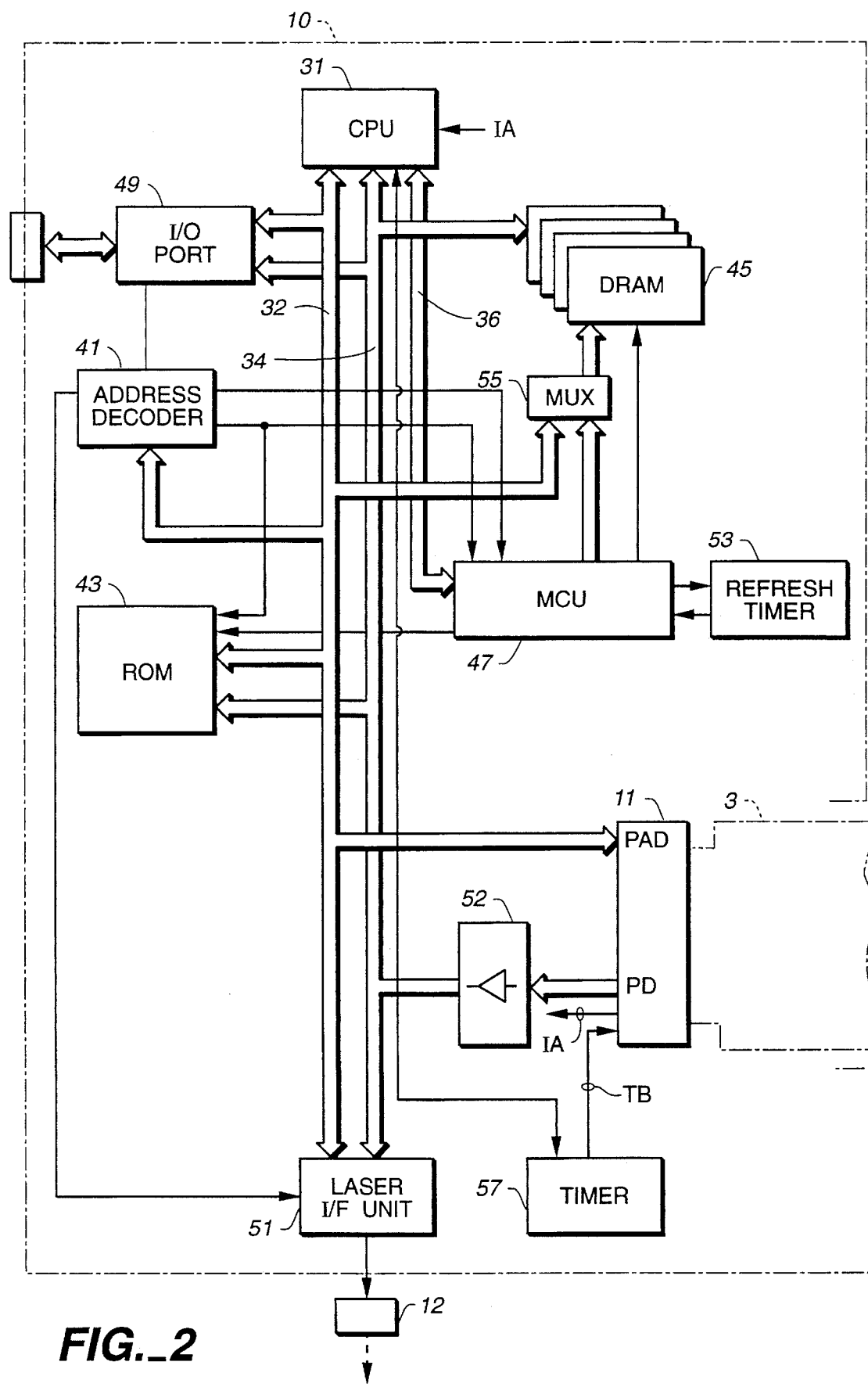
FIG._2

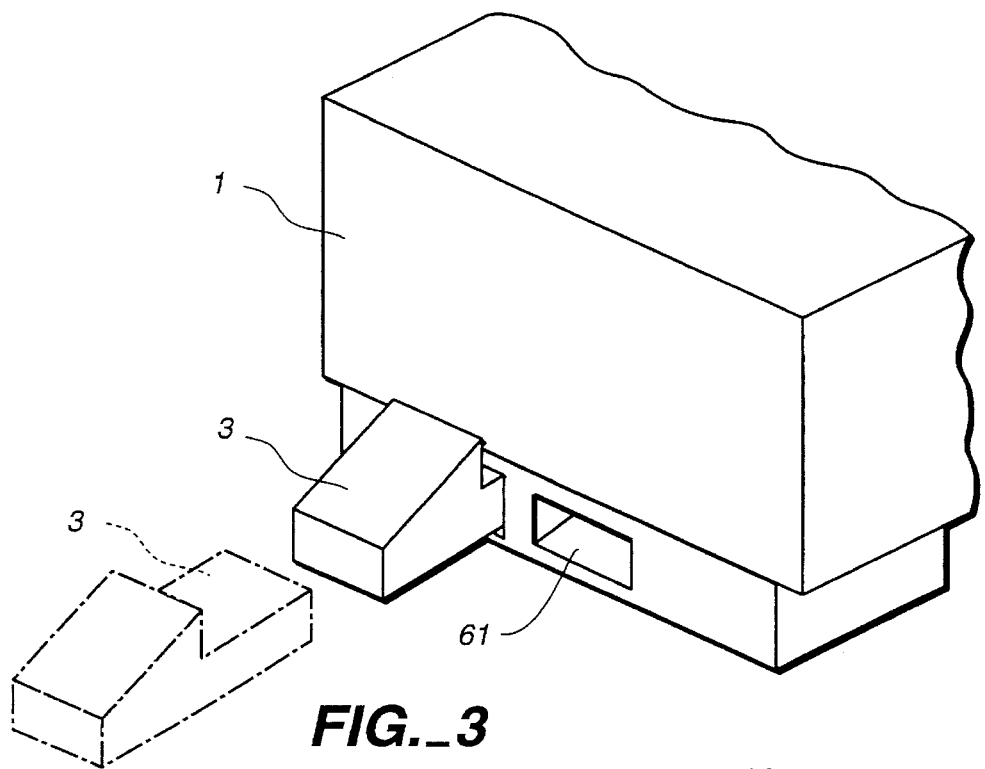
FIG._3
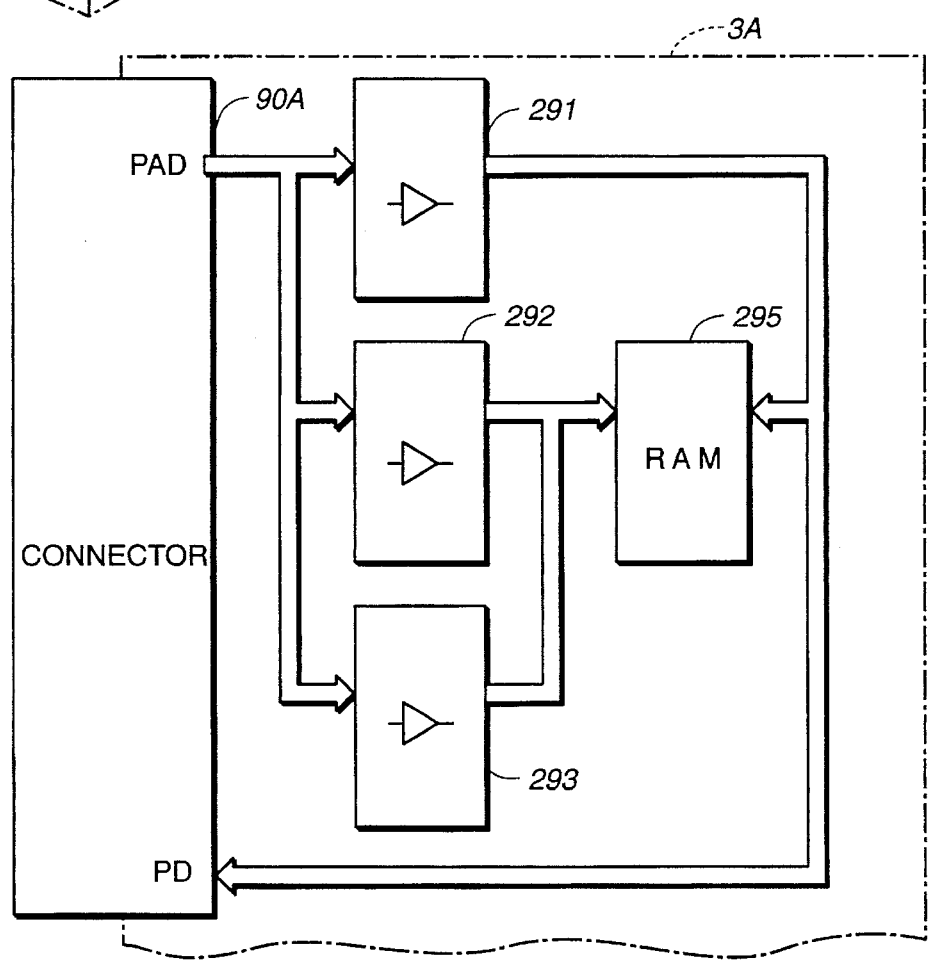
FIG._9

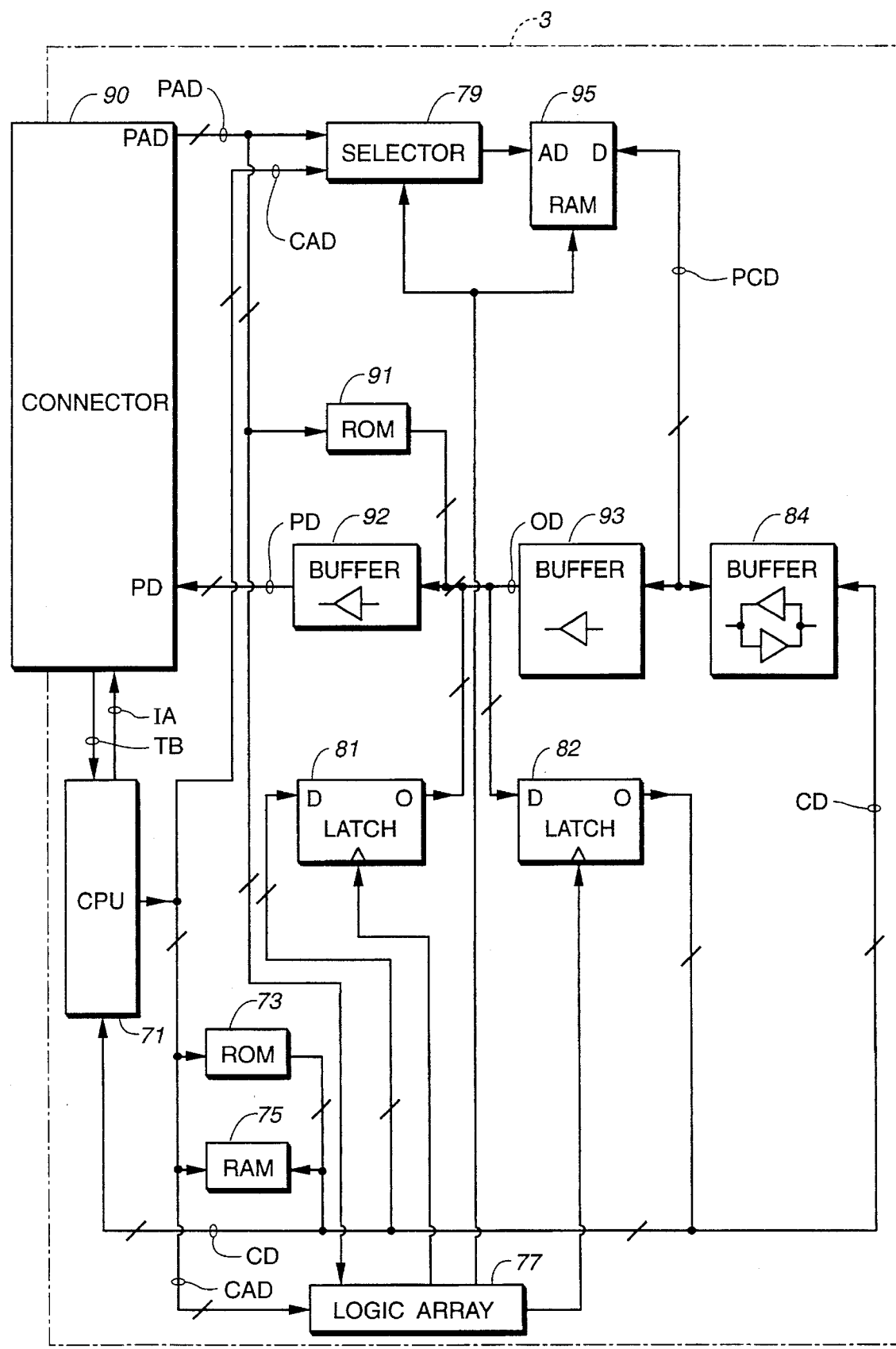
FIG._4

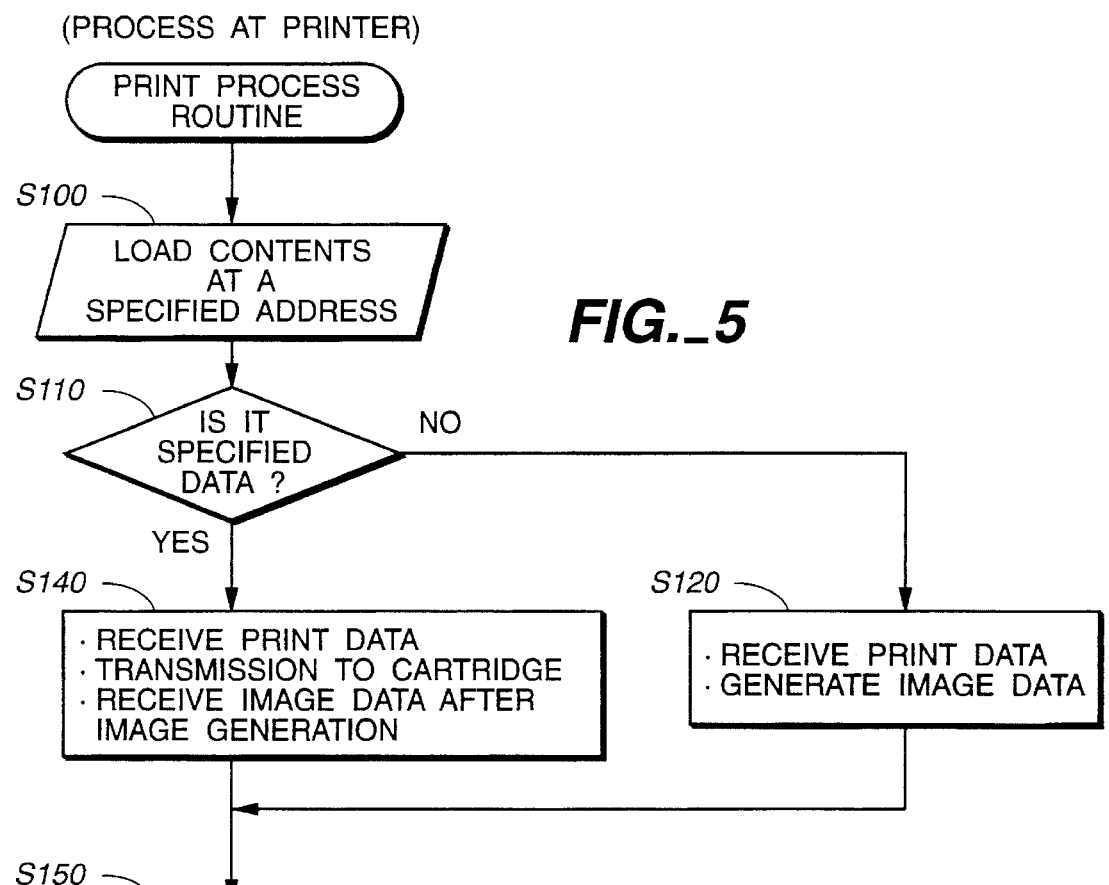
FIG._5
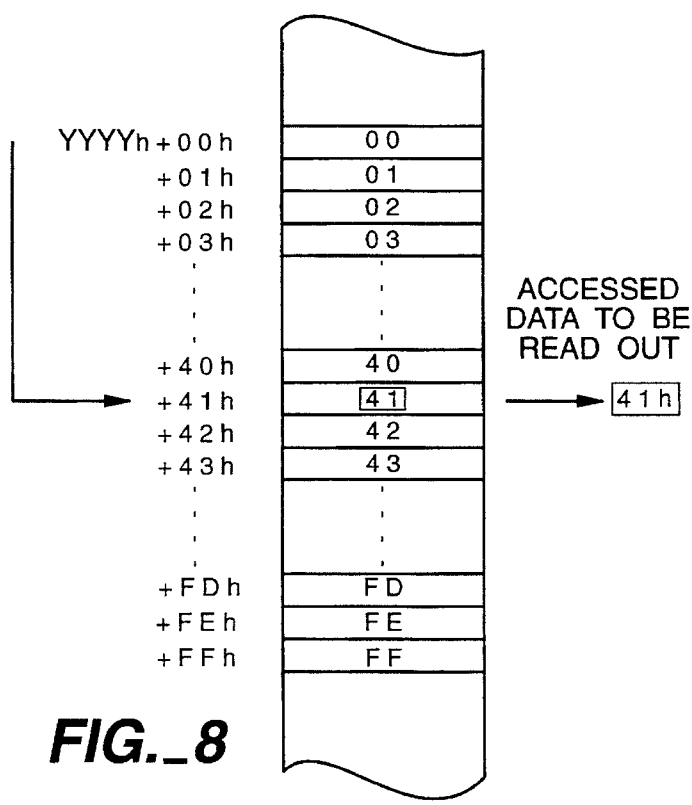
FIG._8

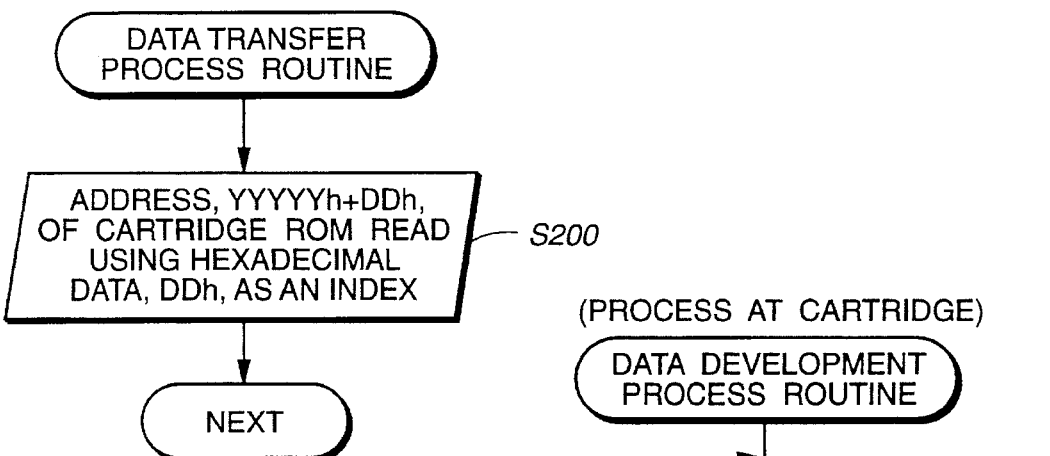
FIG._6
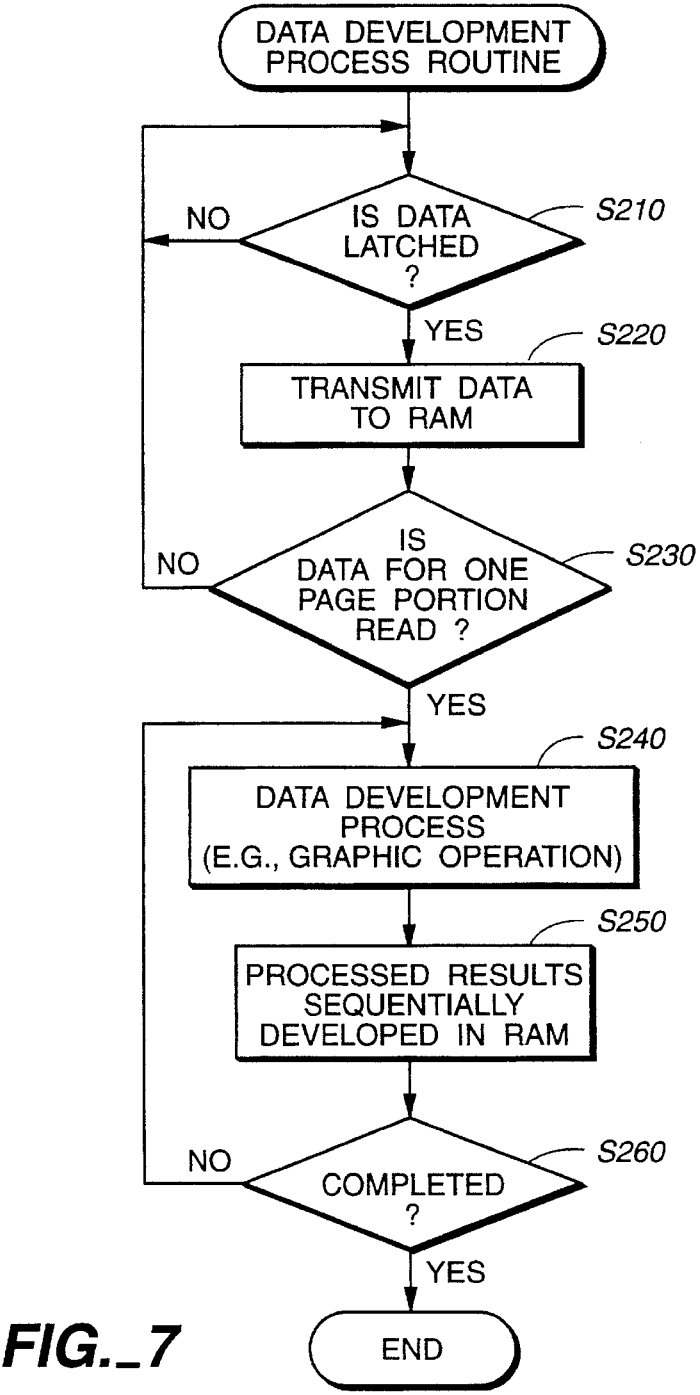
FIG._7

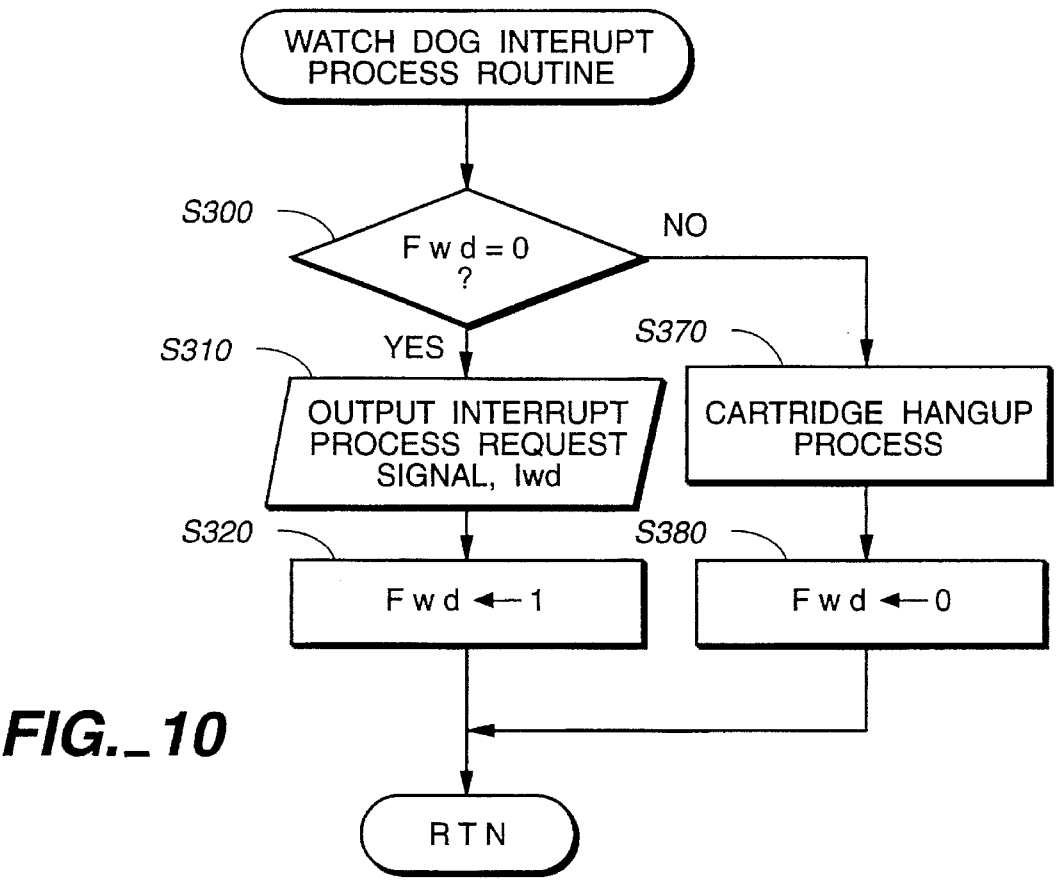
FIG._10
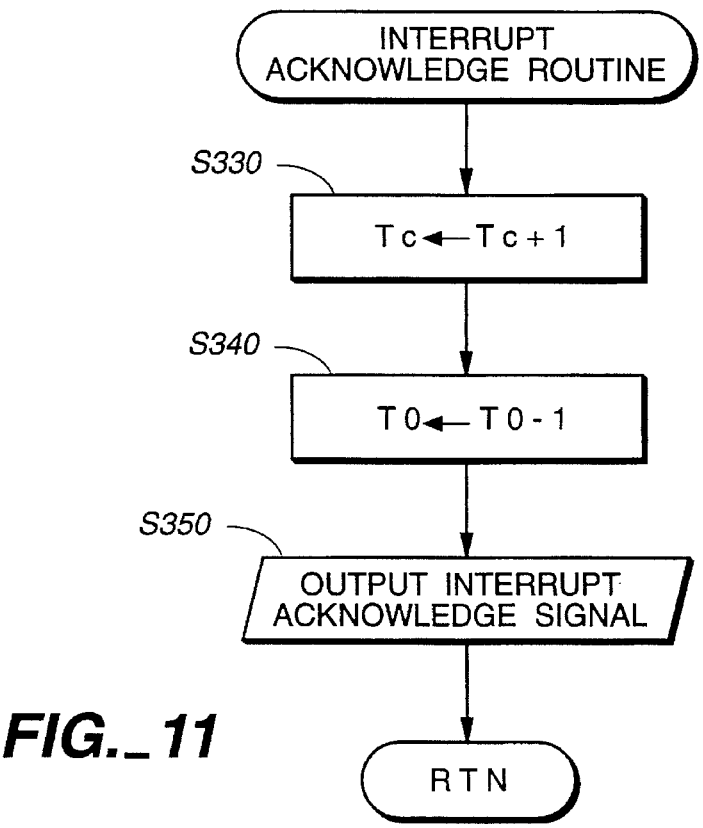
FIG._11

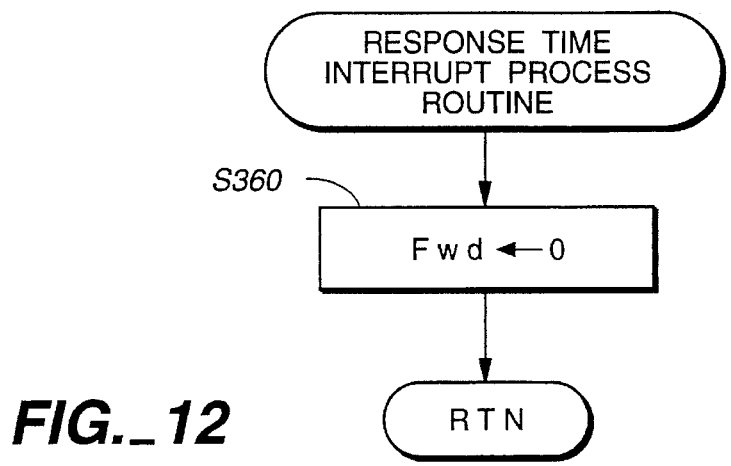
FIG._12
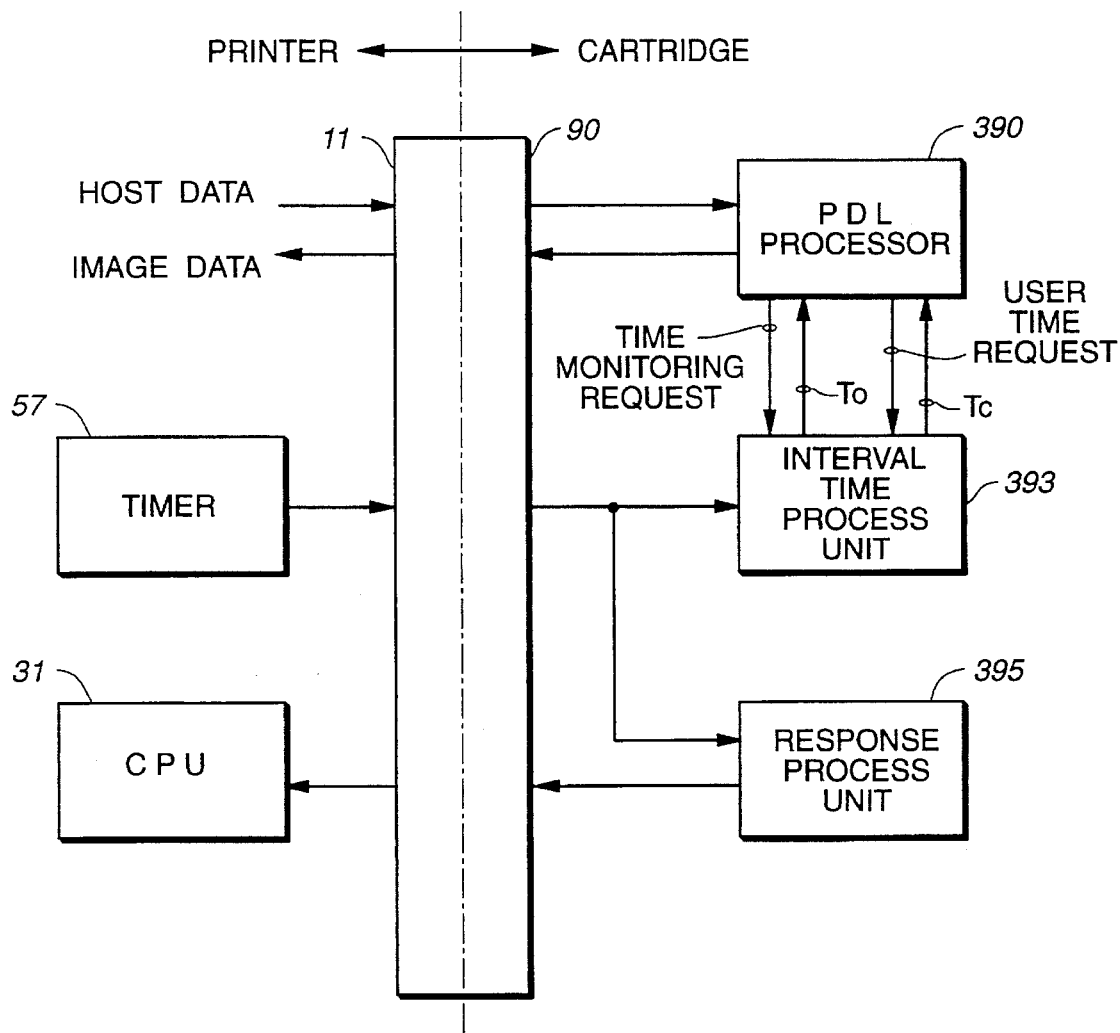
FIG._13

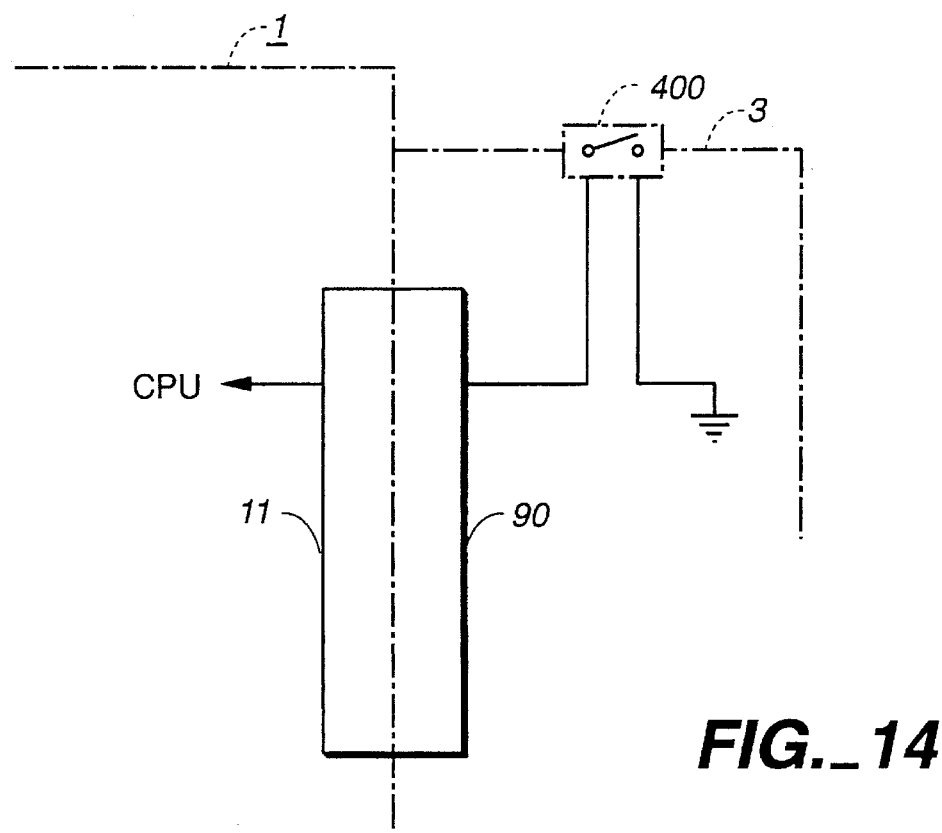
FIG._14
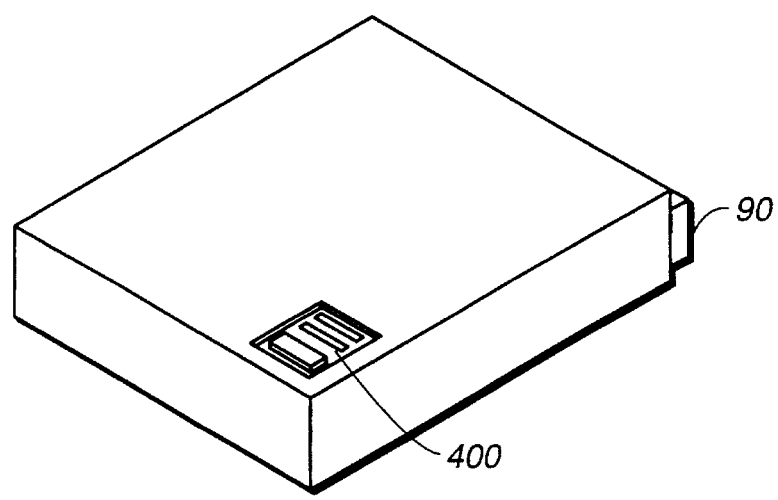
FIG._15

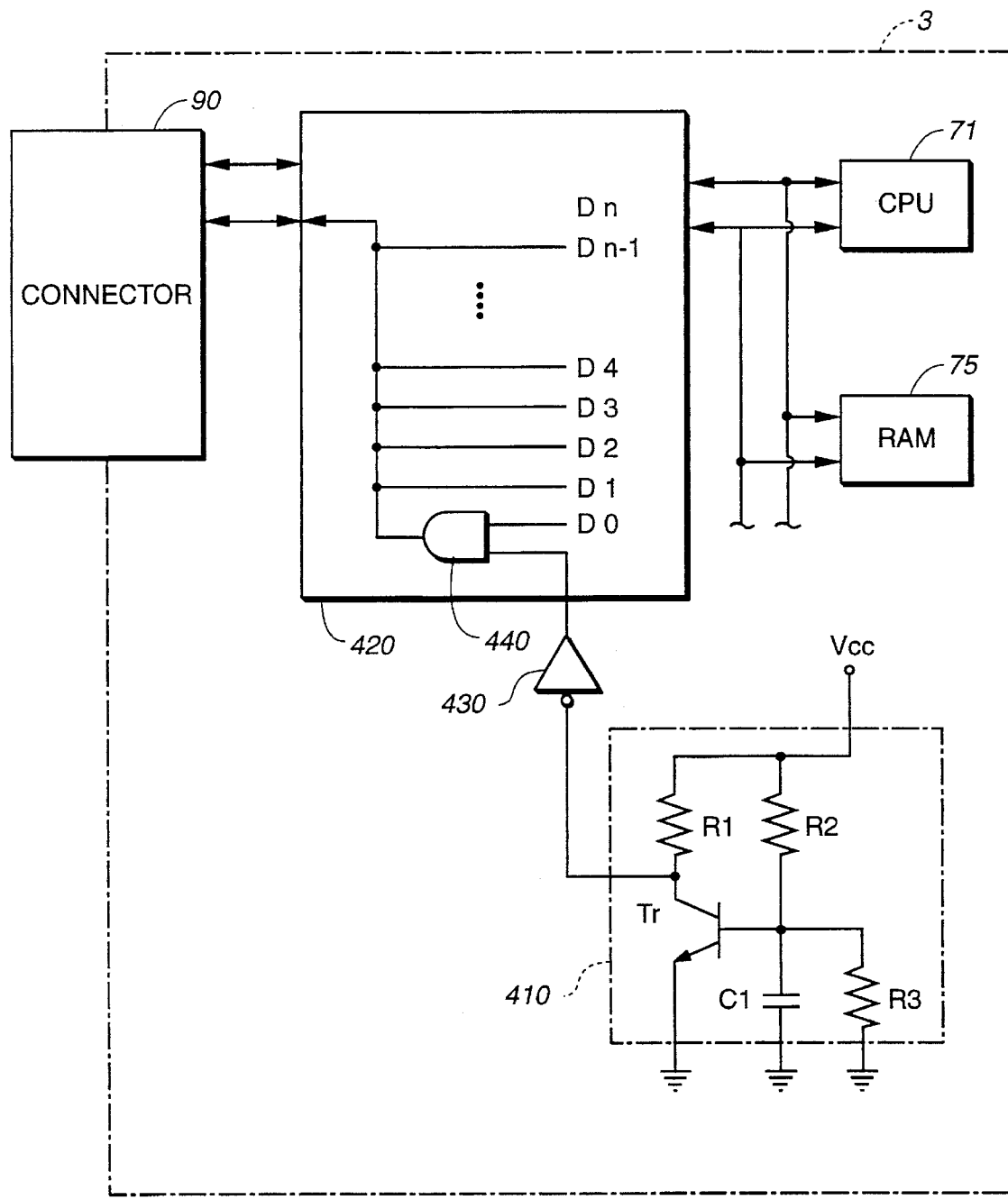
FIG._16

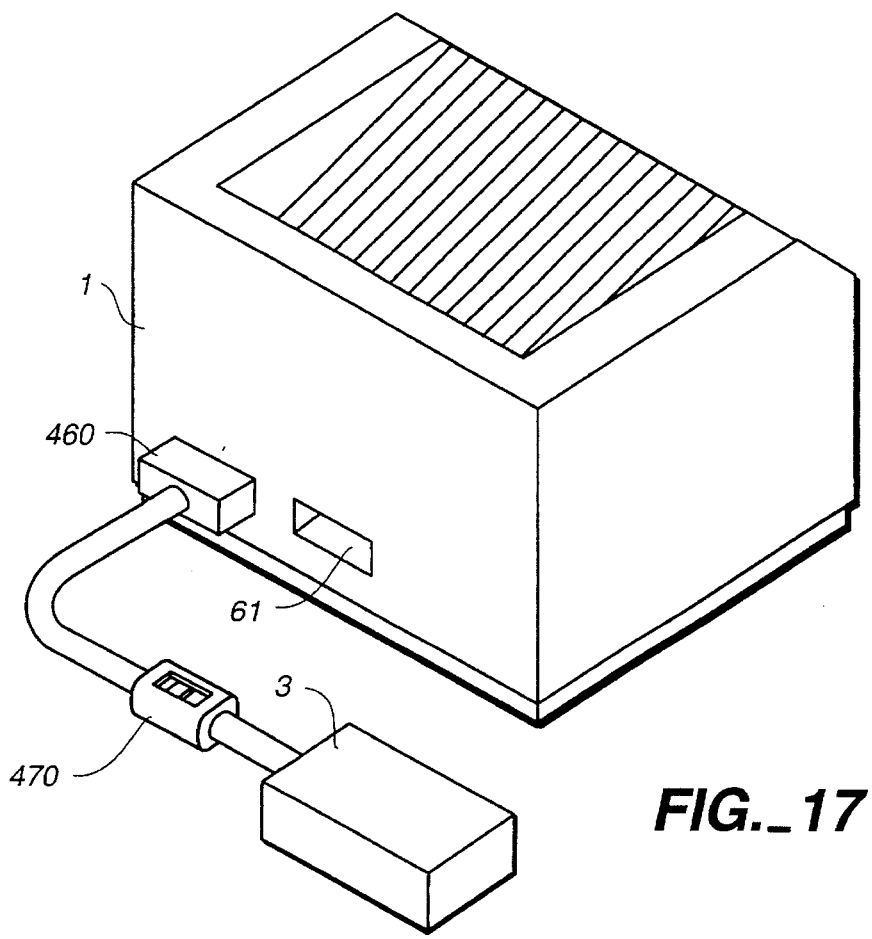
FIG._17
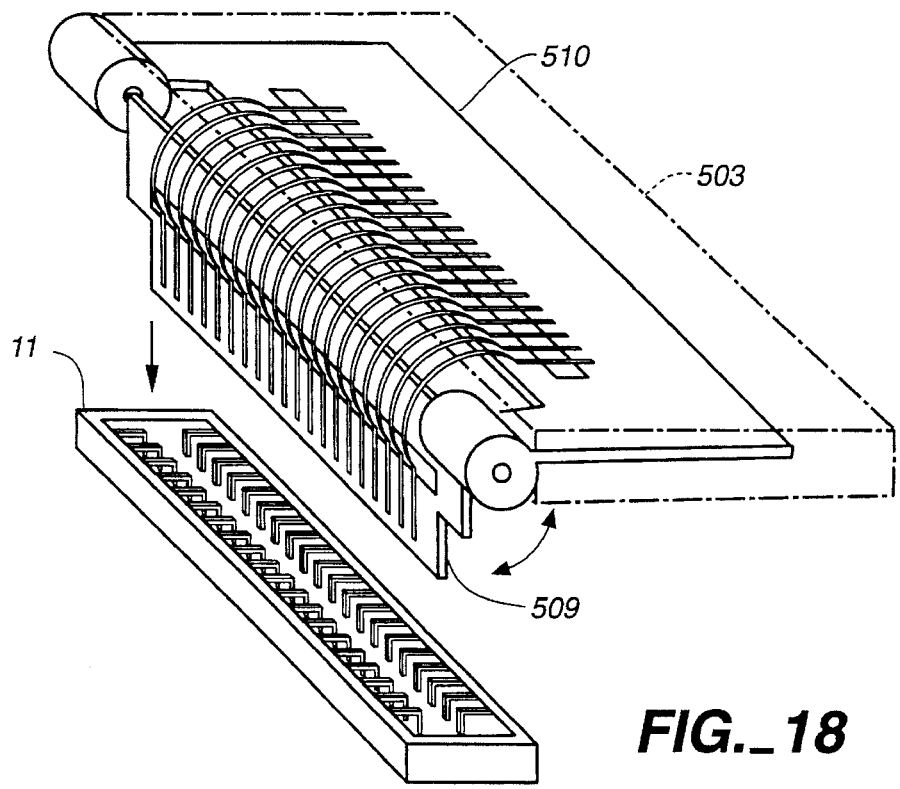
FIG._18

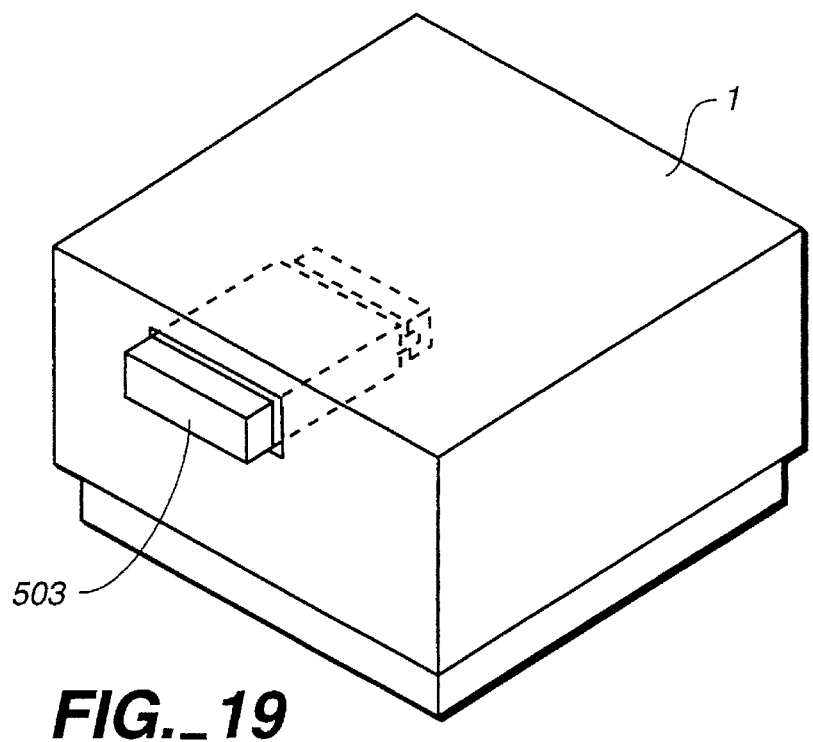
FIG._19
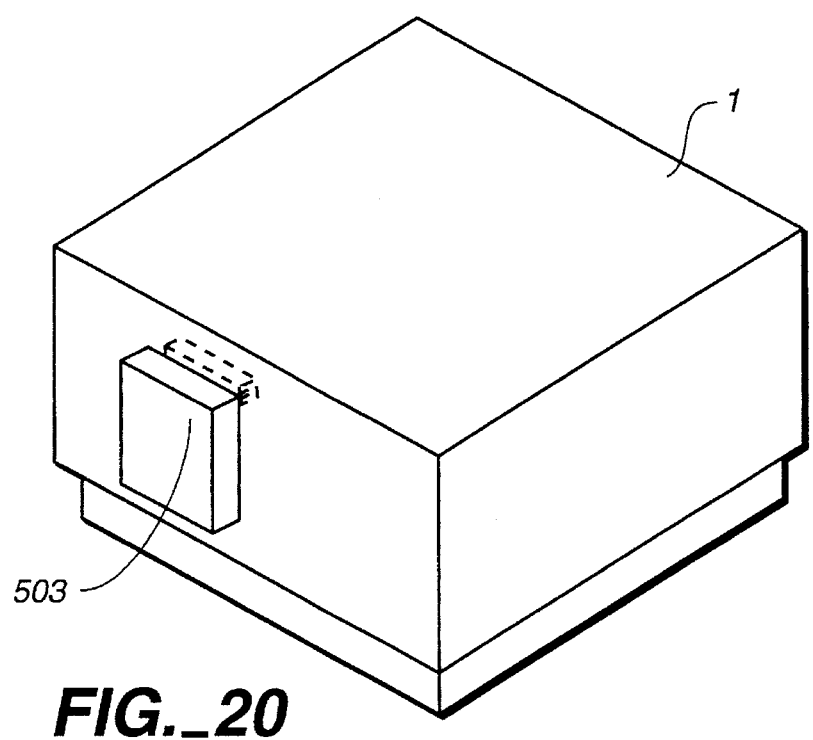
FIG._20

INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING

This is a division, of application Ser. No. 07/816,455 filed on Dec. 30, 1991.

BACKGROUND OF THE INVENTION

1. Field of the Invention

The present invention relates to an intelligent cartridge for plug-compatable use in conjunction with a printer to improve and accelerate printer operation and a method of image processing therefor, and more particularly to an intelligent cartridge for plug-in reception in a page printer printer to function as an accelerator in processing of page description language (PDL) and other such data into image data for printing.

2. Description of the Prior Art

Page printers, such as laser printers, have been quickly and widely marketed in recent years and are rapidly coming the leading device for high-speed data printout from computers. The resolution of a laser printer is typically between 240 to 800 dpi and the most recently developed laser printers can easily print several pages per minute. These printers principally utilize an electrophotographic printer, such as, a xerographic unit having a photosensitive drum as part of its print engine. A laser printer starts printing after storing in memory image data for each page to be printed since the process of printing is continuous through various stations or processes, such as, photoreceptor charging, exposure, toner application and toned image transfer, consecutively executed in synchronism with photosensitive drum rotation, as is well known in the art. Therefore, the capacity of the memory for image data development in a page printer must be sufficiently large to provide for image data of a single page. If image data compression is not available, the memory capacity is fixed by the resolution and the available paper sizes. For example, to print on paper 8 inches in width and 10 inches in length with a resolution of 300 dpi, the total number of the pixels involved may comprise 8×10×300×300=7,200,000, so that the required memory capacity necessary would be 0.9 Mbytes.

A data image processor typically program data of a page description language (PDL), such as, PostScript® (PostScript® is a registered trademark of Adobe Systems, Inc.), may be received in addition to character code data and bit image data. A character code process may be utilized to convert character code data and/or graphic image data into bit image data according to a font pattern stored in the font memory and thereafter storing the data in a bitmap memory and a PDL process for converting print data into image data according to a program of the PDL and storing the converted data in a bitmap memory as a bit image of the image to be printed upon spooling and presentation to the page printer engine.

If print data received from an computer is a bit image of the image to be printed, the printer receives the data to printed and sequentially stores the data. The processing speed depends primarily on and is limited by the data transmission speed. Parallel data transfer, such as, Centronics specification data transfer, is comparatively fast, and, thus, there are few situations where the data transfer speed is below that of the xerographic unit print speed capability.

However, in a case where a printer functions to receive information such as character codes, character size, and character and line pitches as print data and to develop or process the data into a printable image, or in the case where a printer receives a program described in PDL as print data and, thereafter, interprets the data for development and processing by calculating and generating a bit image according to the print data to be printed, the accomplishment of the entire process to completion of image printing is much slower than compared to a simple bit image transfer. In other words, the printer processing speed is limited primarily by the capacity of the operating CPU of the printer and its memory access time, which is much lower than the printing capacity of the xerographic unit per se. As an example, in a case of a page printer which can print 10 pages per minute, the time allowable for preparing the image data for printing each page is no more than 6 seconds. To develop all 0.9 Mbytes of data, the processing time allowed for each byte is as short as 6.67 microseconds (6 seconds/0.9 Mbytes). This processing speed is hardly capable of being accommodated by even a high-speed RISC-type processor. On the other hand, most xerographic units have a print capacity of 10 pages per minute. Thus, the processing capacity of the controller for processing print data into bit image data is an obstacle toward the improvement of printing speed, particularly for present day or existing printers.

The internal memory capacity of some present day page printers are expandable. An example of a memory cartridge for use with a printer is disclosed in U.S. Pat. No. 4,872,091. Also, some page printers have expansion slots to improve the function by attaching one or more cartridges in which fonts or printing programs are stored such as disclosed in U.S. Pat. No. 4,908,637. The font cartridge can be adapted to operate with designated CPU programs in the printer controller but the performance of using the expanded font capability of the printer is limited by the hardware design already existing in the printer. Also, expandable applications are effective in improving the processing speed of the printer by expansion of the printer memory capabilities but they cannot improve overall image processing capacity. Since the buffer between the cartridge and the printer controller is a read-only buffer, matters concerning image processing are left to the printer controller. For example, there is known the employment of an IC cartridge to provide another kind of page language interpreter program in order to enhance functional operation of a printer by means of processing with another PDL and supporting program contained in a ROM in the cartridge, which PDL is not already internally provided in the page printer. The cartridge stores the program in a mask ROM and is inserted into an expansion slot of the printer. In the case of such a printer cartridge which supplies another page language interpreter program, a printer controller reads a specified address location allocated to a cartridge such as immediately when the power is turn on to the printer. If the attached cartridge contains a particular page description language program, a predetermined code is sent back by the printer controller indicating the controller's recognition that the cartridge has an acceptable page language program for operating in conjunction with the printer. The control of the printer is transferred to the interpreter program stored in the cartridge. As a result, the printer can interpret the print data received from an external device according to its particular page language. However, the processing speed is not significantly improved and the total printing speed is often reduced due to the employment of a different, high level page description language.

It is an object of this invention to provide an intelligent cartridge for a printer, in particular, a page printer, wherein the total print capacity is improved and accelerated in spite of the employment of different page language interpreter programs or different high level page description languages.

SUMMARY OF THE INVENTION

According to this invention, the image processing capabilities of a printer accelerated with the employment of a plug-in or connectable cartridge having its own CPU capabilities to process image data for printing under another or different page description language which the printer is not currently able to implement. As a result, the printer with the connected cartridge is able to implement print data processing through the enabled help of the cartridge CPU which may process page description language different from that existing in the original printer and, furthermore, in substantially all cases, the performance of the entire image processing system is enhanced over performance originally possible by the original design of the printer.

The intelligent cartridge of this invention is a printer accelerator detachably connected to a printer connection port and comprises a control unit to develop two dimensional image data based on print data received from an external host and to print the resulting image. The cartridge includes input means for connection to address and data bus lines of the printer via a cartridge connector for receiving the print data, storage means for storing page description language, image developing means that includes an on-board cartridge CPU, separate from the printer control unit CPU, for interpreting print data transferred to the cartridge via the printer control unit, and data transfer means for the transfer of developed image data to the printer for printout on a recording medium. An important aspect of the invention is the use of the printer data bus as a signal line for read-only data from the cartridge. In this manner, the printer can provide the required print data via this read-only process with the intelligent cartridge.

Thus, the printer and the independent cartridge cooperate together to (1) implement the print data transfer via the read-only signal line to the cartridge, (2) interpret print data transmitted from the printer through the cartridge interpreter and develop image data utilizing a different page description language method available in cartridge memory and not available in the printer controller or control unit and (3) print processed image data transferred to the printer.

In a further aspect of this invention, a timer in the printer control unit or in the cartridge is programed by the printer CPU to provided a series of repetitive elapsed time intervals. Response means is provided in the cartridge for returning a prescribed acknowledgment signal to the printer in response to an elapsed time interval from the interval timer in the printer control unit. Thus timing between the printer CPU and cartridge CPU is accomplished by this timing method. During the established timing intervals, print data is received via address and data bus lines to the cartridge, bit image is developed at the cartridge and transmitted to the bitmap memory of the printer for print output. In this manner, the printer CPU has means to determined if the cartridge CPU is functioning in a normal and proper manner so that if a proper response is not received within a specified time interval, communication between the cartridge CPU and printer CPU is terminated and the cartridge can be reinitialized.

With such an architecture, the printer and the cartridge can transfer PDL and bit image data in a reliable and uncomplicated manner without the need for added circuit functionality to the existing printer.

BRIEF DESCRIPTION OF THE DRAWINGS

FIG. 1 is a general configuration of a printer representing a preferred embodiment of the present invention.

FIG. 1A is a high level block diagram of the cartridge/printer system of this invention.

FIG. 1B is high level block diagram of the intelligent cartridge of this invention.

FIG. 1C is a high level block diagram of the cartridge/printer system of this invention adapted also for facsimile mode operation.

FIG. 2 is a block diagram showing the architecture of an electronic console unit or controller incorporated in a printer of the embodiment shown in FIG. 1.

FIG. 3 is a perspective view of an intelligent cartridge comprising this invention attached to the printer.

FIG. 4 is a block diagram of the internal architecture for an intelligent cartridge comprising this invention.

FIG. 5 is a flowchart illustrating a print process routine executed by the printer electronic control unit shown in FIGS. 1 and 2.

FIG. 6 is a flowchart illustrating a data transfer process routine executed by the printer electronic control unit comprising this invention.

FIG. 7 is a flowchart illustrating a data development process routine executed by the intelligent cartridge comprising this invention.

FIG. 8 illustrates the data read process from a ROM utilizing the data as an index.

FIG. 9 is a block diagram illustrating another architecture for print and data transfer between the intelligent cartridge and the printer comprising this invention.

FIG. 10 is a flowchart illustrating a watch dog interrupt process routine executed by the printer electronic control unit of the printer comprising this invention.

FIG. 11 is a flowchart illustrating an interrupt acknowledge routine executed by the cartridge comprising this invention.

FIG. 12 is a flowchart illustrating a response time interrupt process routine executed by the printer electronic control unit comprising this invention.

FIG. 13 is a block diagram generally illustrating the process executed by a timer in the printer electronic control unit comprising this invention.

FIG. 14 illustrates a circuit wherein a switch on the cartridge of this invention is utilized for providing active and inactive settings.

FIG. 15 is a perspective view of the intelligent cartridge comprising this invention illustrating the installation position of the switch show in FIG. 14.

FIG. 16 illustrates the overall architecture of another embodiment of the intelligent cartridge comprising this invention having a timer circuit for counting elapsed time commencing with the beginning of the application of power to the intelligent cartridge.

FIG. 17 is a perspective view of a printer connected to the intelligent cartridge by means of a cable.

FIG. 18 is a perspective view of a connection configuration for connecting the intelligent cartridge to the printer.

FIG. 19 is a perspective view of an intelligent cartridge as inserted into deep connection port of a printer connector.

FIG. 20 is a perspective view of an intelligent cartridge as inserted into a shallow connection port of a printer connector.

DESCRIPTION OF THE PREFERRED EMBODIMENTS

Reference is now made to FIG. 1 which is a block diagram of the general architecture of a preferred embodiment of this invention. Printer 1 comprises a page printer capable of printing by means of xerographic processing. In operation, print data is transmitted from an external source, such as, host computer 5, and printer 1 forms a toned and fused image on a recording medium, such as, paper P. Printer 1 contains a controller comprising electronic control unit 10 which receives print data from computer 5 and develops the print data into a bitmap or bit image data. Intelligent cartridge 3 is insertable into printer 1 for image processing in conjunction with printer control unit 10 and is provided with a connector 11 to which the address bus and the data bus of printer electronic control unit 10 are connected to cartridge 3. Semiconductor laser unit 12 is driven by electronic control unit 10 to selectively expose the charged surface of photosensitive drum 14 in xerographic unit 15 to form a latent image of the processed bit image to be printed. Xerographic unit 15 includes photosensitive drum 14, paper cassette 17 for storing paper P, feed mechanism 19 for feeding single sheets of paper P for tangential engagement with the peripheral surface of photosensitive drum 14, thermal fixing roller unit 21 for fusing toner previously transferred to paper P and an external tray 23 into which printed paper P is fed from printer 1.

Xerography unit 15 also includes a charging unit 25 to apply electrical charge to the surface of photosensitive drum 14. Toner unit 27 applies charged toner onto photosensitive drum 14. Toner cleaner unit 29 removes remaining toner on the surface of photosensitive drum 14 after the toned image has been transfer to paper P. Electronic control unit 10 drives semiconductor laser unit 12 in synchronism with the rotational movement of photosensitive drum 14 and forms a latent image on drum 14 by means of selectively discharging the charged surface in an image-wise formation in accordance with an image to be printed and the image is toned at 27 by the attraction of charged toner to discharged regions of drum 16 that have been exposed to the laser beam. Synchronized with the rotational movement of photosensitive drum 14, a single sheet of paper P is removed from paper cassette 17 and fed tangentially relative to photosensitive drum 14 by feed mechanism 19. Paper P at this point is also fed by rotational movement of photosensitive drum 14 and transfer roller 30. As a result, most of the toner on photosensitive drum 14 is transferred to the paper P. The toned paper P is then fed to fuser unit 21 and the toner is melted by roller heat and fixed to paper P.

It should be noted that application of the present invention is not confined to a laser type printer but also has applicability to other types of printers, such as, LED array printers, thermal printers and ink jet printers.

Reference is now made to FIG. 1A which is a general representation of the cartridge/printer controller or control unit for printer 1. Intelligent cartridge 3 contains its own CPU that is directly connected to the address and data buses of the printer controller 10 through a read-only buffer in the printer controller. Print data can be received from a host computer via I/O input and, under the control of the printer CPU and in communication with the CPU in cartridge 3 via read/write logic in cartridge 3 and timing provided at controller 10, provide print data to cartridge 3, via addressed memory locations in the cartridge, for processing according to the page description language (PDL) contained in the cartridge and, then, transfer the developed bit image data back to printer controller 10 for storage and final printout. It should be noted that since there is only an existing read-only buffer in these printers for the purpose of reading data from an inserted memory or font cartridge, only a read-only interface to the printer CPU is present and there is no protocol ability to access or control via the printer CPU data bus to establish a direct data path for transfer of data from printer controller 10 to cartridge 3. However, a primary feature of this invention is the handling of data transfer to intelligent cartridge 3 via an existing read-only interface provided in present day page printers by the employment of special read/write logic in cartridge 3. This permits the transfer of image processing functions from existing printer controllers directly to the attached CPU supported cartridge resulting in direct enhancement of image processing thereby boosting the printer performance without any modifications being made directly to the existing printer or requiring the purchase of a new printer.

Reference is now made to FIG. 1B which illustrates the basic block components comprising intelligent cartridge 3 of this invention. Cartridge 3 includes an interface to printer controller 10 through which developed bit image data is passed over to the printer control for storage and printout. The printer CPU communicates with cartridge 3 via the control program ROM which functions like a device driver. Cartridge 3 has a high performance CPU, e.g., RISC type processor, and has its own program ROM and a large capacity DRAM, e.g., 2–3 Mbyte DRAM, for receiving print data via CPU controller addressing through the cartridge interface for translation as print data at the control program ROM and subsequent conversion in the cartridge DRAM to bit image data via a PDL program in the CPU cartridge program ROM. Upon development of the bit image data for a single page of data, the data is sequentially transferred in portions, via the dual port logic, to a smaller memory, e.g., a 16 Kbyte SRAM, wherein the image data is sequentially transferred out of cartridge 3 by means of the write support logic to the printer control unit through the cartridge interface.

Reference is now made to FIG. 1C wherein cartridge 3 includes not only page description language capabilities but also includes a phone line interface or modem so that printer 1 can be configured also as a facsimile transceiver. As a specific example, the Hewlett-Packard HP LJ II printer is presently configured with two font slot interfaces. Two cartridges 3 of this invention can be inserted into each slot to use on existing HP LJ II printers for both high speed Postscript® printing and for fax transmission and receipt.

Reference is now made to FIG. 2 which illustrates in more detail electronic control unit 10 of printer 1. Unit 10 comprises an arithmetic and logic operation circuit having a CPU 31 for operating the entire print processing. CPU 31 is connected to address bus 32, data bus 34 and control signal bus 36. Address bus 32 is connected to connector 11 as an address bus, PAD, for cartridge. Bus 32 is connected to address decoder 41, ROM 43, I/O port 49, laser interface (I/F) unit 51 and MUX 55. Data bus 34 is connected to connector 11 of cartridge, via bus driver/buffer 52, when cartridge 3 is engaged, and is also connected to I/O port 49, ROM 43 and laser I/F unit 51. Control signal bus 36 is connected to MCU 47, and MCU 47 is also connected to MUX 55 via a bus. All components, except for connector 11, are connected to respective buses as read/write enabled. Control unit data bus 34 is connected to the read-only data bus, PD, of cartridge 3 via bus driver 52, which is between data bus 34 and cartridge connector 11. Therefore, cartridge 3 is strictly a read-only device as viewed from CPU 31.

Address decoder 41 decodes address signals generated by CPU 31. When an address is designated by CPU 31, decoder 41 provides a select signal to ROM 43, DRAM 45, I/O port 49 and laser I/F unit 51 according to allocation in their designated memory areas. ROM 43 stores an operating program and CPU 31 normally operates according to the program stored in ROM 43. DRAM 45 is utilized for the development and processing of print data into bit image data. Since it is generally necessary to store image data for at least one page, DRAM 45 is provided with a capacity of at least 2 Megabytes.

MCU 47 analyzes and processes the control signals provided from the CPU 31 and outputs control signals for ROM 43 and DRAM 45. MCU also provides read/write signals for memories 43 and 45 and for I/O port 49 and, further, controls the refresh timing for DRAM 45. In this connection, refresh timer 53 is connected to MCU 47, and upon receiving a signal from refresh timer 53, MCU 47 provides a refresh address to DRAM 45 via multiplexer 55 if MCU 47 determines that the timing is proper for memory refresh. I/O port 49 receives print data from computer 5, which is then stored in DRAM 45, and also operates as an interface with xerographic unit 15. Laser I/F unit 51 is connected to electronic control unit 10 and drives and controls the interface of semiconductive laser unit 12. Electronic control unit 10 also includes timer 57 which is connected to both connector 11 and CPU 31 via the control lines shown in FIG. 2.

The basic function of printer 1 utilizing electronic control unit 10 is to process and develop print data into a bit image in advance of printing. Unit 10 also controls the operation of xerographic unit 15 when print data for one page has been processed into a bit image and is ready for printing while also simultaneously driving semiconductor laser unit 12 to printout the image data on paper P. Beside performing these basic functions, printer 1 of the this invention can execute more intelligent printing, as an expanded function utilizing cartridge 3 connected to printer connector 11. Cartridge 3, beside the storage of font data and a software program for interpretation of a page description language, further includes a processor unit to process PDL, which is explained in greater detail below.

FIG. 3 illustrates an external view of cartridge 3, which is designed to be releasably attached in connection port 61 of printer 1. The external construction of cartridge 3 includes a rectilinearly shaped portion for insertion into connection port 61 while a larger trapezoidal shaped portion projects from and remains external of printer 1. When cartridge 3 is fully inserted into connection port 61, a connector portion on the forward end of cartridge 3 is coupled with printer connector 11, and, as a result, printer 1 is electrically coupled to cartridge 3. In this connected state, the larger rearward portion of cartridge 3 is substantially in engagement with the body of printer 1. The upper surface of the rearward portion of cartridge 3 is exposed outside of printer 1 and is provided with an angular surface to prevent the careless placement of objects on the surface of the inserted cartridge.

Reference is now made to FIG. 4 which is a block diagram of the internal circuitry of cartridge 3. In FIG. 4, bus lines are indicated by diagonal slash lines while other connection lines shown are signal lines. Bus lines may be, for example, an 8 bit or 16 bit configuration.

Cartridge 3 includes a CPU 71 which is a separate CPU from CPU 31 of printer electronic control unit 10. CPU 71 may be a RISC type processor which is appropriate for the processing of a page description language (PDL), such as, PostScript®. An address bus, CAD, of CPU 71 is connected to a ROM 73 which stores a page description language, such as, PostScript®, representing character or graphic data or the like, and a PDL program. Address bus CAD is also connected to RAM 75 for storing data, logic array 77 for performing control functions via cartridge address bus, CAD, and selector 79. Both printer address bus, PAD, and cartridge address bus, CAD, are connected to selector 79 and selector 79 is connected as input AD to RAM 95, which may be a 16 Kbyte SRAM. Cartridge data bus CD for CPU 71 is connected to ROM 73, RAM 75, the data input D of first latch 81, the data output 0 of second latch 82, and an of first bidirectional buffer 84. Buffer 84 is shown as a bidirectional buffer but may also be a single direction buffer for only the transfer of bit image data from bus, CD, to bus, PCD, for storage in RAM 95.

With reference to FIGS. 2 and 4, when cartridge 3, is electrically coupled to printer controller 10 by means of the releasable attachment of connector 90 to connector 11, printer address bus 32 is electrically coupled to its counterpart bus PAD on cartridge 3. Printer data bus, PD, is driven by the output of buffer 92 across attached connectors 90, 11 and received by the input of buffer 52. Control interrupt signals IA and TB also are coupled between the print controller 10 and cartridge 3 by means of connectors 90, 11 as in FIGS. 2 and 4. Both cartridge address bus, CAD, and printer address bus, PAD, are coupled to logic array 77 as inputs.

The primary function of cartridge 3 is to execute bidirectional data communication (read/write) via read-only data bus PD. ROM 91 (e.g., 128 Kbyte ROM) with its input coupled to printer address bus, PAD, operates under the control of control unit CPU 31 and functions similar to an I/O driver. ROM 91 has two portions. A first portion is a translation table containing print data information, a portion of which is illustrated in FIG. 8. The print data, DDh, in the example here is 8 bit wide for a table having 256 memory locations. A second portion contains a program which is executed by control unit CPU 31 for the transfer of print data address signals to cartridge 3. Thus, if cartridge 3 is attached, CPU 31 will function with cartridge ROM 91 rather than control unit ROM 43.

Address signals, YYYYh+DDh, are provided on address buses 32 and PAD which are coupled to and decoded by logic array 77 and utilized for addressing locations in ROM 91 corresponding to print data to be developed. FIG. 8 illustrates a portion of these address signals representing DDh data as part of the byte address and function as an index or pointer to print data locations in the access table of ROM 91. ROM 73 contains operating programs for CPU 71 including a PDL program. As previously indicated, RAM 75 has a large capacity for receiving at least one page of bit image data processed by CPU 71 based upon print data accessed from ROM 91. The data accessed at ROM 91 is provided on OD bus onto the CD bus via latch 82 under the control of logic array 77. The data is developed by CPU 71 and the bit image data is stored in RAM 75 until a full page of data has been completed. Segments of the page image data are thereafter transferred to RAM 95 in segments via buffer 84 when logic array 77 has placed RAM 95 in its write-enable state. Based upon cartridge timing, logic array 77 places RAM into its read-enable state after which the stored image data in RAM 95 is transferred off of cartridge 3 via the read-only data bus, PD under the control of logic array 77, and stored in DRAM 45 in preparation for printing.

An input bus to second buffer 92 is referred to as output bus, OD. Output bus, OD, is connected to the data output of ROM 91, the output O of first latch 81, the input D of second latch 82 and the output of third unidirectional buffer 93. The input of third buffer 93 is connected to printer/cartridge data bus, PCD, which is connected also between first buffer 84 and the data input D of RAM 95. Latches 81 and 82 are tri-state devices and they can latch and hold the contents of their inputs D for presentation at their outputs 0 under the control of logic array 77. Also, under the control of logic array 77, these latches are able to convert their outputs into a high-impedance state. Logic array 77 is also connected to control selector 79 and RAM 95, which components will be explained later. Logic control array 77 controls selector 79 and RAM 95 either as addressed by CPU 71 via address bus, CAD, or as addressed by CPU 31 in electronic control unit 10 via address bus, PAD, connected to address bus 32 in electronic control unit 10.

It will be understood by those skilled in the art that an alternate approach to the use of the data table in ROM 91 is that the print data portion, DDh, with each address byte on address bus, PAD, may be decoded and data DDh portions provided to a tri-state latch (similar to latches 81 and 82) for transfer to RAM 75 and processing into bit image data. This approach would require additional logic and logic control on cartridge 3 compared to the configuration of FIG. 4, which latter configuration would be a more cost effective approach.

In operation, when CPU 31 of electronic control unit 10 provides an instruction to read the contents at a specified address of RAM 95 in cartridge 3, logic array 77 analyzes the address and switches selector 79 to enable printer address bus, PAD, and to change RAM 95 to its read-enable state. The data read from RAM 95 is transmitted to CPU 31 of electronic control unit 10 via printer/cartridge data bus, PCD, third buffer 93, output data bus, OD, second buffer 92 and printer data bus, PD. Therefore, if the bit image data has already been written in advance in a specific area of RAM 95 by CPU 71 of cartridge 3 via cartridge data bus, CD, first buffer 84 and print/cartridge data bus PCD, the bit image data can be transferred from cartridge 3 over to electronic control unit 10.

It should be noted that there is another way to transfer the bit image data from cartridge 3 to electronic control unit 10. Since first latch 81 is connected to cartridge data bus, CD, CPU 71 can hold the bit image data at first latch 81. When electronic control unit 10 instructs the addresses allotted to first latch 81 under this condition, logic array 77 enables the output 0 from first latch 81 and the latched bit image data is transferred to electronic control unit 10 via output data bus, OD, buffer 92 and printer data bus, PD.

Since the data bus connecting electronic control unit 10 and cartridge 3 is read-only as viewed from electronic control unit 10 via one-way driver 52, it is a simple task to transfer data from cartridge 3. As previously indicated, it is not possible for cartridge 3 to receive any data from control unit 10 by normal access and communication protocol. However, the present invention utilizes the above described architecture to accomplish the transfer of the data to cartridge 3 by the following method.

When control unit CPU 31 executes an instruction via a program stored in ROM 91 to read the contents of a specified address in cartridge ROM 91, logic array 77 analyzes the address and operates second latch 82, via specified timing, to capture the data output of ROM 91. ROM 91 functions as a tri-state device relative to bus, OD. As a result, the data read out from ROM 91, via bus, OD, is latched at second latch 82 and can be read by cartridge CPU 71 through control of logic array 77. At this same time, second buffer 92 is idle so that any data in this latch cannot be read by control unit CPU 31. Thus, there is no problem if control unit CPU 31 tries to read data at buffer 92 via control unit driver 52 and printer data bus, PD, since no data will be present.

CPU 71 will then output a specific address to logic array 77, via address bus, CAD, to enable the output of second latch 82 and reads its contents and stores the content in RAM 75. Thus, data loading from control unit 10 is accomplished in address coding wherein a portion of address data from control unit 10 is utilized as an index or pointer to print data already stored in a memory table in ROM 91. With the decoding of the address data via logic array 77, print data is accessed out of ROM 91 via logic array 77 for development into bit image data.

Next to be described are the processing operations executed by electronic control unit 10 and cartridge 3. Cartridge 3 processes page description language (PDL) and printer 1 delivers the PDL transmitted from computer 5 to cartridge 3 and, on reception of the processed result from cartridge 3, unit 10 operates xerographic unit 15 to print the developed image data.

Reference is made to FIG. 5 which shows a flowchart of the print process routine executed by electronic control unit 10. When the print process commences, control unit CPU 31 first executes the process of loading contents at a specified address at ROM 91 into RAM 75 (step S100). The expected addressed contents of specified data is returned in the case where cartridge 3 has been attached to printer 1. If the expected specified data is not returned (step S 110), CPU 31 determines that cartridge 3 is not attached and alternatively receives print data from computer 5 and develops the bit image data within control unit 10 per se. Then, according to the print data received from computer 5, electronic control unit 10 generates bit image data for a single page (step S120).

If the expected addressed contents is return as specified at the address location in ROM 91 and, therefore, CPU 31 has reliably determined that cartridge 3 is attached (step S110), CPU 31 will proceed as follows. CPU 31 receives print data from computer 5, and receives the image data developed in cartridge 3 according to the print data (step S140). An image data transfer process is executed wherein CPU 31 in printer 1 directly executes a transfer program in cartridge 3, which process is described in greater detail later.

Through the process described above, DRAM 45 stores either the image data generated by electronic control unit 10 when cartridge 3 is not attached or the image data developed by cartridge 3 when cartridge 3 is attached. Then, printer 1 operates xerographic unit 15 according to the developed image data in order to print the image onto paper P (step S150).

Data transfer from electronic control unit 10 to cartridge 3 is executed by the data transfer process routine of printer 1, which is illustrated in the flowchart of FIG. 6, and by the data development process routine of cartridge 3, which is illustrated in the flowchart of FIG. 7. Electronic control unit 10 commences with the data transfer routine shown in FIG. 6 if there is print data to be transferred to cartridge 3. When this processing commences, electronic control unit 10 operates to read address YYYYh+DDh of ROM 91 of cartridge 3 utilizing the hexadecimal data DDh (h is a code indicating hexadecimal representation) as an index to a location in the ROM translator table of FIG. 8 (S200).

Following this operation, logic array 77 of cartridge 3 controls second latch 82 to latch the data read out from ROM 91. As shown in FIG. 8, for 256 bytes of data commencing with addresses starting from YYYYh of ROM 91, data from 00h to FFh is written in advance. When addresses commencing from YYYYh are read utilizing the data to be transmitted as an index, the print data corresponding to the index, which is latched at second latch 82, is provided on output data bus, OD. FIG. 8 shows a specific example for the case wherein print data to be accessed is data 41h.

At this time, cartridge CPU 71 is carrying out the data development process routine illustrated in the flowchart of FIG. 7. CPU 71 determines first if second latch 82 has latched data (step S210) and if it has not yet latched data, will wait until the data is latched. When the data is latched by second latch 82, CPU 71 executes the process of transferring the data from second latch 82 to print data memory, RAM 75 (step S220). CPU 71 also determines if all the print data for one page has been loaded from electronic control unit 10 into RAM 75 (step S230). The foregoing process via steps S210 to S230 are repeated until print data for a single page is completely loaded in RAM 75. The data transferred from electronic control unit 10 to RAM 75 is the page description language (PDL) program.

On completion of the loading of print data for one page (step S230), CPU 71 executes the data development process (step S240). The data development process executed by CPU 71 is a graphic operation to generate and develop the PDL program into a graphic image having a resolution of 300 dpi. The final operational results are sequentially developed at RAM 95 (step S250). The above described processes (steps S240 to S250) are repeated until the completion of the data development and storage of the results. The data development process (step S240) is executed by CPU 71 which is a processor and not CPU 31 of electronic control unit 10. On completion of the image data development (step S260), the operation comes to an [END], and the developed image data is then sequentially transferred to electronic control unit 10 via printer data bus, PD (FIG. 5, step S140).

In summary, when cartridge 3, incorporating CPU 71 for image processing, is attached to connector 11 in electronic control unit 10, cartridge CPU 71 receives print data from printer 1 as a portion of the address byte code and accordingly develops the print data into bit image data for transfer to control unit 10 and printing at xerographic unit 15. Therefore, in comparison with the case where cartridge 3 supplies the function of the page description language processor per se, the operating performance of the page description language is significantly improved. It is also possible to supply a higher level page process language, such as, PostScript® level 2 with a cartridge CPU.

It is, thus, possible to transfer print data to cartridge 3 while utilizing connector 11 which is incorporated for the purpose of supplying fonts and a page description language processor to printer 1 and which is equipped with a read-only data bus when viewed from the side of electronic control unit 10. Therefore, the cartridge adapter of this invention may be used with any existing laser or page printer not previously or originally designed for attachment of a PDL interpreter cartridge incorporating a CPU. Therefore, with the employment of such PDL interpreter cartridge, existing printers can be effectively utilized to their fullest potential in performance and speed of printing.

Generally, when a main frame computer functions are improved, the printer connected to the computer becomes a bottleneck in the system. Thus, the older printer may need to be replaced at the time of upgrading the functionality of the main frame computer. With the implementation of the PDL interpreter cartridge of this invention, all that is required is the attachment of cartridge 3 to the older existing printer 1 thereby saving costs in procurement of an new printer.

Although ROM 91 is employed for writing data thereto while utilizing a read-only signal line, this architecture has an alternative which is illustrated in FIG. 9. For example, some portion of the addressing at the time of reading may be stored directly as print data at RAM 295 of cartridge 3A. This alternate architecture requires three tri-state buffers 291, 292 and 293 and RAM 295. The handling of address data is accomplished as follows. Four most significant bits (AD23 to AD20) of the 24-bit address signal (AD23 to AD0) from electronic control unit 10 are connected to the address decoder (not shown in FIG. 9), and function for the reservation predetermined memory area for data write and other predetermined memory area for data read. In this particular embodiment, the area where address AD23, AD22, AD21 and AD20 is 1000, or where the four most significant bits are 8h, is utilized as a write area, and the area where address AD23, AD22, AD 21 and AD 20 is 1001, or where the four most significant bits are 9h, is utilized as a read area. The other twenty bits of address signal AD19 to AD0 are connected as follows. The least significant eight bits AD7 to AD0 of address signals AD 19 to AD0 are connected to the input of first tristate buffer 291, the next twelve bits AD19 to AD8 are connected to the input of second tri-state buffer 292, and the low order, twelve bits AD11 to AD0 are connected to the input of third tri-state buffer 293. The outputs from first and second tri-state buffers 291 and 292 become effective when a address corresponding to an operational write function to RAM 295 is initiated and the output, via appropriate timing, is placed in a high impedance state. The output from first tri-state buffer 291 is then connected to the data input of RAM 295, the output from third tri-state buffer 292 is ORed with the output of second tri-state buffer 293 and provided at addresses RA11 to RA0 of RAM 295. The output from the third tri-state buffer 293 becomes effective when the address corresponding to a read operation is initiated. Through other appropriate timing, the output from buffer 293 is in high-impedance state. This output is ORed with the output from second tri-state buffer 292 and provided at addresses RA11–RA0 of RAM 295. RAM 295 may have a capacity of 4 Kbytes and its effective address is 12 bits, or 000h to FFFh.

To have electronic control unit 10 write data DDh to a specified address, e.g. address C5Ah, of RAM 295 in cartridge 3A via connector 90A, the contents of address 8C5ADDh should first be read. First, access to address 8XXXXXh from the electronic control unit 10 is determined as a write operation. Then, the output from first and second tri-state buffers 291 and 292 becomes effective. When RAM 295 reverts to the write mode, address signals AD19 to AD8 from the electronic control unit 10 are provided to address RA11 to RA0 of RAM 295 and data DDh is written to this address.

To have electronic control unit 10 read the contents at a specified address, e.g. C5Ah, of RAM 295 of cartridge 3A, the contents at address 9XXC5Ah should first be read. First, the access to address 9XXXXXh by electronic control unit 10 is determined as a read operation. Then, the output from third tri-state buffer 293 becomes effective. When RAM 295 reverts to the read mode, address signals AD11 to AD0 are provided from electronic control unit 10 to address RA11 to RA0 of RAM 295 and the contents at this address are read out. With this architecture, the electronic control unit 10 can write and read at an arbitrary address of cartridge RAM 295.

In a further expansion of an embodiment of this invention, electronic control unit 10 may include timer 57, which is connected to connector 11 by signal line TB. Signal line TB is also connected to cartridge CPU 71 as an interrupt request. Timer 57 is further connected directly to CPU 31 of electronic control unit 10, and interval timing is setup at timer 57 by CPU 31 to output an interrupt request to cartridge CPU 71 at specified intervals. In periods of elapsed time, cartridge CPU 71 returns to the read mode operation.

Reference is now made to FIG. 10 wherein control unit CPU 31 executes a watch dog interrupt process routine repetitively at specified timing intervals. At the beginning of this routine, CPU 31 first determines whether or not the value at flag, Fwd, is 0 (step S300). The initial value of flag, Fwd, is 0 and remains zero as long as cartridge CPU 71 is operating normally. Therefore, if CPU 31 determines that the value of flag, Fwd, is 0, CPU 31 controls timer 57 to provide an interrupt process request signal, Iwd, to cartridge 3 via signal line TB (step S310). After setting the value at flag, Fwd, to 1 (step S320), CPU 31 terminates this routine upon reaching RTN.

On receiving the interrupt process request signal, Iwd, via signal line TB, cartridge CPU 71 commences an interrupt acknowledge process routine illustrated in FIG. 11. With the commencement of this routine, CPU 71 executes a process to increment the value of variable, Tc, by 1 (step S330), which process relates to the time required for processing page description language after the power is turned on. Then, CPU 71 executes a process to decrement the variable, T0, by 1 (step S340), which process is utilized for the monitoring of the wait time for print data reception from electronic control unit 10 and the amount of time required for completion of the printing on paper P. Since cartridge 3 does not have a counting timer for keeping track of timing, these signals from electronic control unit 10 are utilized for timing at the cartridge adapter.

After output of the interrupt acknowledge signal (step S350), CPU 71 terminates this routine upon reaching RTN. The interrupt acknowledge signal provided from CPU 71 is provided to CPU 31 of electronic control unit 10 as interrupt acknowledge signal, IA, via connectors 90 and 11. On receiving signal, IA, CPU 31 utilizes the response time interrupt process routine of FIG. 12. On commencing this routine, CPU 31 resets the value at flag, Fwd, to 0 (step S360) and terminates the routine upon reaching RTN.

Thus, so long as the foregoing described processing is being executed in a normal manner at both electronic control unit 10 and cartridge 3, a condition where the value at flag, Fwd, is at 1 will not occur. Therefore, the determination made at step S300 of the routine in FIG. 10 is always [YES], and cartridge CPU 71 utilizes the interrupt process request signal, Iwd, to count the time required for the page description language.

If, on the other hand, cartridge CPU 71 cannot operate properly due, for example, to program run-way, the interrupt acknowledge process routine of FIG. 11 and the response time interrupt process routine of FIG. 12 will not be executed. As a result, the value at the flag, Fwd, will remain at 1 and the determination at step S300 will be [NO]. CPU 31 will recognize this as a failure to operate and communicate and will execute the required processes after cartridge 3 has hung up from further processing (step S370). These processes include visual and/or audio indication to the user of the occurrence of a problem, followed by reset and reinitialization of cartridge 3 and restart at the print data transfer step. On completion of these processes, the value at the flag, Fwd, is reset to 0 (step S380 in FIG. 10) and CPU 31 will terminate this routine upon reaching RTN. The above described processing is further illustrated by way of the block diagram in FIG. 13. When the interrupt process request signal, Iwd, is provided from timer 57 of electronic control unit 10, interval timer process unit 393 provides for counting of the timer variables, Tc; T0, for page description language (PDL) interpreter or processor 390 and a response process unit 395 outputs an interrupt acknowledge signal, IA, to control unit CPU 31. Interval timer process unit 393 returns the time value, Tc, on receiving a user time request signal, for example, from PDL processor 390 or, upon receiving a time monitoring request for the time waiting for data reception from electronic control unit 10, and returns a time-out signal when the time value, T0, becomes 0.

The architecture described above is has the advantage of being highly simplified since the print data to image data accelerator of cartridge 3, separately attached to printer 1, does not require its own timer in cartridge 3 and can utilize timer 57 of electronic control unit 10 to accurately detect an operational problem in cartridge 3. Although the embodiment utilizes control unit CPU 31 to detect a problem in cartridge 3, a circuit exclusively for problem detection can be incorporated in either printer 1 or in cartridge 3.

Reference is now made to the embodiment shown in FIGS. 14 and 15. Cartridge 3 is determined to be active or inactive by control unit CPU 31 when CPU 31 reads the contents of a specified address in ROM 91 and determines that cartridge 3 is attached if the contents are at a specified data location. Therefore, if cartridge 3 is attached, it is always active, but it is also possible that, as attached, the cartridge may be alternately active or inactive too. In such a situation, the continual detachment or attachment of cartridge 3 is not good relative to durability. For this reason, cartridge 3 may be provided with a switch 400 which, if in its OFF state, will prevent cartridge 3 from being responsive to transmit the specific code indicative that cartridge 3 is in its attached state when CPU 31 of electronic control unit 10 attempts to read cartridge ROM 91. As shown in FIG. 15, switch 400 may be located on the outside cover of cartridge 3 for easy access by the user when cartridge 3 is attached to printer 1. Although the output of switch 400 in FIG. 14 is provided to control unit CPU 31, it is preferred to connect the switch output to a reset signal generation circuit in cartridge 3 (not shown) so that CPU 71 and cartridge 3 will be reset and initialized when switch 400 is turned ON to permit printer 1 to recognize the presence of cartridge 3.

A possible problem that may occur in the attachment and detachment of cartridge 3 is the situation where cartridge 3 is inserted for attachment while the power for printer 1 has been previously turned ON. Generally, RAM 75 in cartridge 3 would be the dynamic type and, therefore, its memory performance cannot be assured without the elapse of a predetermined time interval after the supply voltage has reached a specified voltage level. This duration of time is different for different types of DRAM memories, and some DRAM memories require about 200 ms. For this reason, if cartridge 3 is immediately attached before electronic control unit 10 accesses the specific address to check for the attachment state of cartridge 3, it may happen that a writing operation onto RAM 75 will not occur or be assured even though electronic control unit 10 recognizes the presence of cartridge 3 and commences writing initial print data to RAM 75. This problem can be prevented by incorporating a timer circuit 410 and control circuit 420 in cartridge 3, illustrated in FIG. 16. Timer circuit 410 provides an output to a control circuit 420. Control circuit 420 is a circuit which outputs specific data, e.g., FFh, which will indicate the presence of cartridge 3 when a specified address is accessed by electronic control unit 10.

Timer circuit 410 incorporates first and second parallel connected resistors R1; R2, which are connected at one end thereof to power supply line, Vcc, of cartridge 3. Transistor Tr has its collector and base respectively connected to first resistor R1 and second transistor R2 and its emitter connected to ground. Third resistor R3 is connected at one end to the base of transistor Tr and capacitor C1 together with second resistor R2. The other end of resistor R3 and capacitor C1 are connected to ground.

In operation, circuit 410 functions as an integrator located at the base terminal of transistor Tr which is switched ON after a period of time. With the introduction of cartridge 3 in printer 1, the power supply line voltage, Vcc, immediately rises in cartridge 3 and the collector terminal voltage of transistor Tr immediately goes to a high level and, at the same time, the base terminal voltage begins to gradually rise. When the base terminal voltage exceeds a specified value, transistor Tr will turn ON and its collector potential will drop to a low level since it will be connected to ground.

The collector terminal of transistor Tr of timer circuit 410 is connected to inverter 430 and the output from inverter 430 is connected to one of the input ports of an AND gate 440 in control circuit 420 which AND gate is attached to the least significant bit D0 of the data bus for control circuit 420. Therefore, so long as the output signal from timer circuit 410 is at a high level, AND gate 440 will be off so that the least significant bit D0 of the output from control circuit 420 is always 0. As a result, the content of the specified address accessed by electronic control unit 10 is always FEh. About 500 ms after cartridge 3 has been energized, the output signal from timer circuit 410 is reversed to a low level. When the content of the specified address is read by electronic control unit 10, the content of FFh is provided as output and electronic control unit 10 is able to recognize that cartridge 3 has been attached. Since the circuit architecture of FIG. 16 allows printer 1 to recognize cartridge 3 only after the function of RAM 75 of cartridge 3 has been assured, print data will not be written from electronic control unit 10 until there is final assurance of the functional operation of cartridge RAM 75.

If cartridge 3 contains a CPU 71 and several memory IC chips, the size of cartridge 3 may itself be large. The size of an attachment in the form of a cartridge 3 coupled to printer 1 is limited by connection port 61. In order to increase the inner capacity of cartridge 3, it is necessary either to increase the thickness of the end or the longitudinal length of cartridge 3. If these methods are attempted, the projected portion of cartridge 3 extending out of printer 1 may be too large for secured connection and stability. In such a case, a cable 450, as shown in FIG. 17, may extend from cartridge 3 and having at its forward end connector 460 adapted for insertion into connection port 61 for direct coupling to connector 11. In this embodiment, there is no limitation on the size of cartridge 3. Further, cartridge 3 can be configured-to have practically the same width and length configuration as printer 1 and function as a support beneath printer 1 with cartridge active/inactive switch 400 provided on its front surface for easy user access.

Because cartridge 3 enables data writing with only the need of a read only data bus (PD), various types of present day or existing printers can be easily employed for conjunction with the application of this cartridge. However, these existing printers have different configurations for connection port 61 wherein some printers are adapted to receive a substantial portion of cartridge 3 in the printer while other printers are adapted to receive only connector 90 of cartridge 3 in printer. In the latter situation, it will be very unstable to attach a large size cartridge 3 to extend any great length from the body of the printer. In order to accommodate these variations in existing printers, various types of universal adaptors can be provided. In one example shown in FIG. 18, connector 509 of cartridge 503 may be adapted to be rotatable on a printed circuit (PC) board 510 in cartridge 503 so that cartridge 503 can be attached to connector 11 in a folded state orthogonal with PC board 510 or may be maintained in an aligned position with PC board 510 depending on the particular application requirements. This two alternatives are illustrated in connection with FIGS. 19 and 20 wherein if printer connection port 61 is deep insertion pocket as shown in FIG. 19, connector 509 will aligned with PC board 510 for deep insertion inserted and attachment to printer 1. On the other hand, if connection port 61 is shallow insertion pocket as shown in FIG. 20, connector 509 may be folded at a right angle relative to the main body of cartridge 503, which is placed or secured against the outer vertical surface of printer 1.

Although preferred embodiments of the present invention have been described and illustrated in detail, it should be understood that they are intended only for purposes of illustration and example and are not to be taken as a limitation on the scope of the invention, which is limited only by the terms of the appended claims. Further, it is evident to those skilled in the art that there are many further alternatives, modifications and variations which will be apparent in light of the foregoing description. For example, other configurations for cartridge 3 are clearly possible with internal outline fonts receiving character point data and other data from 1 printer, generating a bit image of the specified points for the character data and transferring the data to printer 1. Also, printer 1 may be another type of printer such as an ink jet printer or thermal printer. Thus, the invention described herein is intended to embrace all such alternatives, modifications, applications and variations that may fall within the spirit and scope of the appended claims.

What is claimed is:

1. A printer having a CPU driven print control unit to develop a two dimensional bit image based on print data received from an external source and printout an image based upon the developed bit image, an intelligent cartridge for attachment to said printer and for electrical connection to address and data buses in said control unit via a cartridge/control unit connector, said cartridge including print data input means for receiving said print data via said connector to said printer buses, and further including image development means having a CPU for developing a bit image based on said print data, and data transfer means for transfer of said developed image data to said printer, said printer including an interval timer for providing a sequence of timed interval signals and providing said timed interval signals to said cartridge CPU for timing of operations for said print data input means and said image development means, response means in said cartridge CPU for sending an acknowledge signal to said printer in response to said timed interval signals from said printer interval timer, and detection means in said printer for determining the lack of response from said cartridge CPU to said timed interval signals indicative of a malfunction.

2. A method of image processing carried out, in part, via a separate intelligent cartridge having its own CPU processing unit and releasably connected to a printer having a CPU operated control unit, said cartridge electrically connected to said printer control unit to provide read-only address capability to said cartridge and a read-only data capability to said printer control unit, said printer control unit capable of developing a two dimensional bit image based on print data received from an external source and to thereafter print-out the bit image, and comprising the steps off:

generating in said printer control unit a sequence of timed interval signals, providing said timed interval signals to said cartridge CPU for timing operations of the bit image development within said cartridge, utilizing said timed interval signals further as a status check of the progress of said bit image development, responding with an acknowledge signal from said cartridge CPU to said said printer control indicative that bit image development progress is valid, and detecting in said prinrcontrol unit the lack of said acknowledge signal indicative that a malfunction has occurred at said cartridge.

3. The printer of claim 1 including diagnostic processing means for initializing said cartridge upon detection by said detection means of said malfunction.

4. The printer of claim 1 including a cable connecting said connector in said printer to said cartridge.

5. The printer of claim 4 including switch means in said cartridge cable for turning on and off the functional operation of said cartridge.

6. The printer of claim 1 including switch means on said cartridge for turning on and off the functional operation of said cartridge.

7. The printer of claim 1 wherein said printer connector is located on a sidewall of said printer and a portion of said cartridge is expose outside of said printer, said exposed portion having an upper surface that is inclined at an angle relative to a horizontal plane.

8. The printer of 1 wherein said printer is a page printer having a xerographic print unit.

* * * * *

UNITED STATES PATENT AND TRADEMARK OFFICE
CERTIFICATE OF CORRECTION

PATENT NO. : 5,592,595
DATED : January 7, 1997
INVENTOR(S) : Kenichi Wakabayashi, et. al.

It is certified that error appears in the above-indentified patent and that said Letters Patent is hereby corrected as shown below:

Title page, Foreign Application Priority Data, insert--October 23, 1991 [JP] Japan 3-305457--.
Title page, item [57], line 7, delete "," after "Depending".
Column 17, line 12, change "off:" to --of:--.
Column 18, line 1, change "prinrcontrol" to --printer control--.

Signed and Sealed this

Third Day of June, 1997

Attest:

BRUCE LEHMAN

Attesting Officer

Commissioner of Patents and Trademarks